US010854219B2

(12) United States Patent
Kayama

(10) Patent No.: US 10,854,219 B2
(45) Date of Patent: Dec. 1, 2020

(54) VOICE INTERACTION APPARATUS AND VOICE INTERACTION METHOD

(71) Applicant: Yamaha Corporation, Hamamatsu (JP)

(72) Inventor: Hiraku Kayama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 99 days.

(21) Appl. No.: 16/002,208

(22) Filed: Jun. 7, 2018

(65) Prior Publication Data

US 2018/0294001 A1 Oct. 11, 2018

Related U.S. Application Data

(63) Continuation of application No. PCT/JP2016/085126, filed on Nov. 28, 2016.

(30) Foreign Application Priority Data

Dec. 7, 2015 (JP) ................................ 2015-238911
Dec. 7, 2015 (JP) ................................ 2015-238912
(Continued)

(51) Int. Cl.
*G10L 13/00* (2006.01)
*G10L 25/90* (2013.01)
(Continued)

(52) U.S. Cl.
CPC .............. *G10L 25/90* (2013.01); *G10L 13/00* (2013.01); *G10L 13/10* (2013.01); *G10L 15/02* (2013.01);
(Continued)

(58) Field of Classification Search
CPC ....... G10L 25/90; G10L 13/027; G10L 13/10; G10L 12/0335; G10L 13/033;
(Continued)

(56) References Cited

U.S. PATENT DOCUMENTS 8,214,216 B2 * 7/2012 Sato ...................... G10L 13/027 704/258
9,536,523 B2 * 1/2017 Bakish .................... G10L 15/24
(Continued)

FOREIGN PATENT DOCUMENTS

JP 2008-151840 A 7/2008
JP 2012-128440 A 7/2012
(Continued)

OTHER PUBLICATIONS

Extended European Search Report issued in counterpart European Application No. 16872840.0 dated Apr. 15, 2019 (seven pages).
(Continued)

*Primary Examiner* — Vijay B Chawan
(74) *Attorney, Agent, or Firm* — Crowell & Morinig LLP

(57) ABSTRACT

A voice interaction apparatus acquires a speech signal indicative of a speech sound, identifies a series of pitches of the speech sound from the speech signal, and causes a reproduction device to reproduce a response voice of pitches controlled in accordance with the lowest pitch of the pitches identified during a tailing section proximate to an end point within the speech sound.

22 Claims, 8 Drawing Sheets

(30) Foreign Application Priority Data

Dec. 7, 2015 (JP) ................................ 2015-238913
Dec. 7, 2015 (JP) ................................ 2015-238914
Apr. 27, 2016 (JP) ................................ 2016-088720

(51) Int. Cl.

| | |
|---|---|
| ***G10L 15/18*** | (2013.01) |
| ***G10L 13/10*** | (2013.01) |
| ***G10L 15/02*** | (2006.01) |
| ***G10L 15/22*** | (2006.01) |
| ***G10L 25/48*** | (2013.01) |
| *G10L 21/013* | (2013.01) |
| *G10L 13/033* | (2013.01) |

(52) U.S. Cl.
CPC .......... *G10L 15/1807* (2013.01); *G10L 15/22* (2013.01); *G10L 25/48* (2013.01); *G10L 13/0335* (2013.01); *G10L 21/013* (2013.01)

(58) Field of Classification Search
CPC ......... G10L 13/06; G10L 15/18; G10L 15/22; G10L 19/09; G10L 19/097; G10L 13/08; G10L 15/08; G10L 15/1822; G10L 15/187; G10L 17/14; G10L 17/22; G10L 19/005; G10L 19/028; G10L 19/20
USPC ....... 704/207, 258, 233, 243, 249, 254, 263, 704/267
See application file for complete search history.

(56) References Cited

U.S. PATENT DOCUMENTS

| | | | | |
|---|---|---|---|---|
| 9,685,152 B2* | 6/2017 | Matsubara | G10L 13/027 | |
| 2001/0032078 A1* | 10/2001 | Fukada | G10L 13/10 | 704/258 |
| 2003/0125934 A1* | 7/2003 | Chen | G10L 25/90 | 704/207 |
| 2004/0153314 A1* | 8/2004 | Sato | G10L 21/0364 | 704/207 |
| 2005/0055207 A1* | 3/2005 | Fukada | G10L 13/10 | 704/254 |
| 2006/0167690 A1* | 7/2006 | Sato | G10L 21/0208 | 704/249 |
| 2013/0246062 A1* | 9/2013 | Avargel | G10L 25/90 | 704/233 |
| 2016/0034446 A1* | 2/2016 | Yamamoto | G10H 7/008 | 704/9 |
| 2016/0086597 A1* | 3/2016 | Matsubara | G10L 13/027 | 704/243 |
| 2016/0283193 A1* | 9/2016 | Lin | G06F 3/01 | |
| 2017/0040021 A1* | 2/2017 | Faure | G10L 19/005 | |
| 2017/0110111 A1* | 4/2017 | Matsubara | G10L 13/027 | |
| 2017/0221481 A1* | 8/2017 | Fukunaga | G10L 15/22 | |
| 2017/0351366 A1* | 12/2017 | Popovich | G10L 15/22 | |

FOREIGN PATENT DOCUMENTS

| | | |
|---|---|---|
| JP | 2014-191029 A | 10/2014 |
| WO | WO 97/43756 A1 | 11/1997 |
| WO | WO 2014/192959 A1 | 12/2014 |

OTHER PUBLICATIONS

Cover page of EP 0 919 052 A1 published Jun. 2, 1999 (one page).
International Search Report (PCT/ISA/210) issued in PCT Application No. PCT/JP2016/085126 dated Feb. 7, 2017 with English translation (four pages).
Japanese-language Written Opinion (PCT/ISA/237) issued in PCT Application No. PCT/JP2016/085126 dated Feb. 7, 2017 (five pages).
Japanese-language Office Action issued in counterpart Japanese Application No. 2015-238913 dated Jan. 7, 2020 with English translation (six (6) pages).

* cited by examiner

VOICE INTERACTION APPARATUS AND VOICE INTERACTION METHOD

CROSS REFERENCE TO RELATED APPLICATIONS

This application is a Continuation Application of PCT Application No. PCT/JP2016/085126, filed Nov. 28, 2016, and is based on and claims priority from Japanese Patent Application No. 2015-238911, filed Dec. 7, 2015, Japanese Patent Application No. 2015-238912, filed Dec. 7, 2015, Japanese Patent Application No. 2015-238913, filed Dec. 7, 2015, Japanese Patent Application No. 2015-238914, filed on Dec. 7, 2015, and Japanese Patent Application No. 2016-088720, filed Apr. 27, 2016, the entire contents of each of which are incorporated herein by reference.

BACKGOUND OF THE INVENTION

Field of the Invention

The present invention relates to a voice interaction (spoken dialog) technology that generates a voice in response to a human speech.

Description of the Related Art

There has been proposed a voice interaction technology that realizes interaction with a user by reproducing a response voice (e.g., an answer to a question) in response to speech of the user. For example, Japanese Patent Application Laid-Open Publication No. 2012-128440 (hereinafter referred to as Patent Document 1) discloses a technology in which speech content is analyzed by voice recognition of a speech sound of a user, and a response voice that is in accordance with a result of the analysis is synthesized and reproduced.

In conventional technologies, including that disclosed in Patent Document 1, in reality it is difficult to realize natural voice interaction in which tendencies of real-life interactions between humans are realistically reflected. As a result, a problem exists in that a user could perceive a mechanical and unnatural quality during such voice interaction.

SUMMARY OF THE INVENTION

In view of the above circumstances, the present invention has as an object realization of natural voice interaction.

In order to solve the above problem, a voice interaction method according to a first mode of the present invention includes: acquiring a speech signal indicative of a speech sound; identifying a series of pitches of the speech sound from the speech signal; and causing a reproduction device to reproduce a response voice of pitches controlled in accordance with the lowest pitch of the pitches identified, in the identifying of the series of pitches of the speech sound, during a tailing section proximate to an end point within the speech sound.

A voice interaction apparatus according to a second mode of the present invention includes: a processor coupled to a memory storing instructions that, when executed by the processor, configure the processor to: acquire a speech signal indicative of a speech sound; identify a series of pitches of the speech sound from the speech signal; and cause a reproduction device to reproduce a response voice of pitches controlled in accordance with the lowest pitch of the pitches identified during a tailing section proximate to an end point within the speech sound.

DESCRIPTION OF THE EMBODIMENTS

First Embodiment

Figure 1:
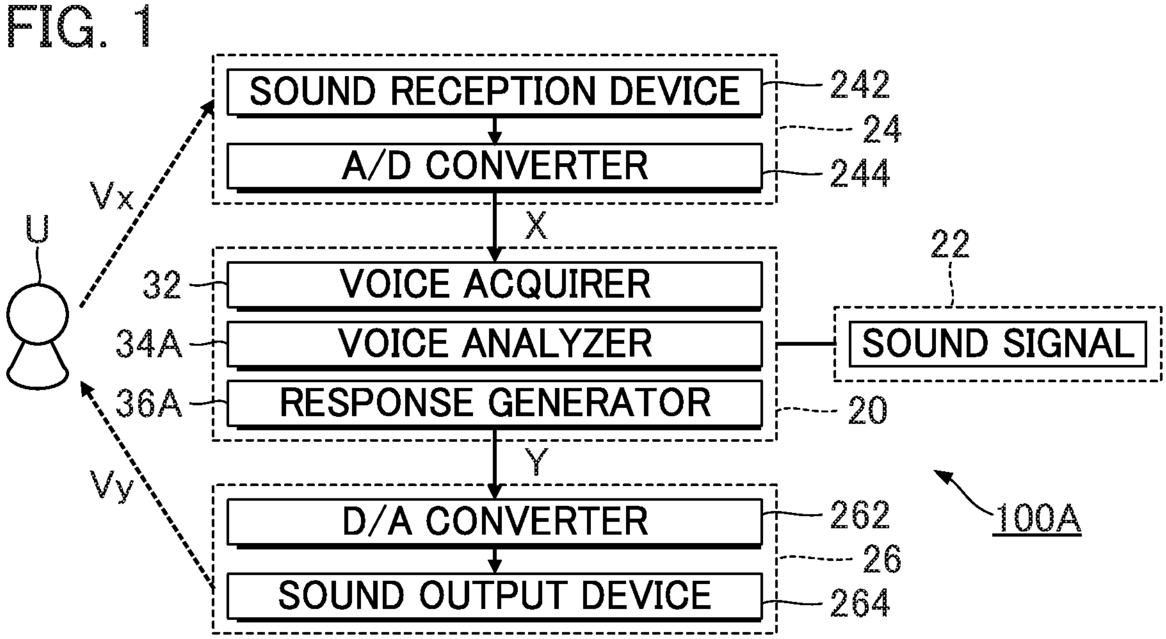
FIG. 1 is a diagram showing a configuration of a voice interaction apparatus according to a first embodiment.

FIG. 1 is a diagram showing a configuration of a voice interaction apparatus 100A according to a first embodiment of the present invention. The voice interaction apparatus 100A in the first embodiment is a voice interaction system that reproduces a voice (hereinafter referred to as a "response voice") Vy directed to an input voice (hereinafter referred to as "speech sound") Vx uttered by a user U. As the voice interaction apparatus 100A, a portable information processing device, such as a mobile phone or a smartphone, or an information processing device, such as a personal computer, may be used. The voice interaction apparatus 100A may be realized in the form of a robot or a toy that imitates appearances of an animal (e.g., a stuffed animal).

The speech sound Vx is a voice (an example of the input voice) of speech that includes, for example, an inquiry (question) addressed to a person and a statement addressed to a person. The response voice Vy is a responsive voice that includes an answer to an inquiry or a response to a statement. The response voice Vy includes, for example, a voice indicative of an interjection. An interjection is an independent word (ejaculation or exclamation) that is used independently of other clauses and has no conjugation. More specifically, examples of an interjection may include: words expressing a backchannel to speech, such as "un" or "ee" (corresponding to "aha" or "right" in English); words indicative of hesitation in speech (stagnant response), such as "eto" or "ano" ("um" or "er" in English); words expressing responses (affirmation or negation to a question), such as "hai" or "iie" ("yes" or "no" in English); words expressing emotions of a speaker, such as "aa" or "oo" ("ah" or "wow" in English); and words indicative of an inquiry concerning speech (a request to repeat a part of speech), such as "e?" or "nani?" ("pardon?" or "sorry?" in English).

The voice interaction apparatus 100A in the first embodiment generates a response voice Vy with a prosody that corresponds to a prosody of a speech sound Vx. A prosody of a sound is a linguistic and phonetic characteristic perceivable by a person who hears the sound; and is a characteristic that cannot be understood from general writings of a language alone (e.g., written form without special notation that represents a prosody). In other words, a prosody is a characteristic that causes a hearer to conjure or conjecture intentions or feelings of a speaker. More specifically, the concept of prosody includes a variety of characteristics, such as inflection (variation in a sound key or intonation), sound tone (pitch or dynamic of a sound), sound length (speech length), speech rate, rhythm (structure of temporal variation in a sound tone), or accent (accent in a pitch or dynamic). A typical example of a prosody is a pitch (fundamental frequency) or a volume.

As shown in FIG. 1, the voice interaction apparatus 100A in the first embodiment includes a control device 20, a storage device 22, a voice input device 24, and a reproduction device 26. The voice input device 24 generates a sound signal (hereinafter referred to as "speech signal") X indicative of, for example, a speech sound Vx of the user U, and includes a sound reception device 242 and an A/D converter 244. The sound reception device (microphone) 242 receives the speech sound Vx uttered by the user U and generates an analog sound signal representative of variations in sound pressure of the received speech sound Vx. The A/D converter 244 converts the sound signal generated by the sound reception device 242 into a digital speech signal X.

The control device 20 is an arithmetic processing device (e.g., CPU) that centrally controls each element in the voice interaction apparatus 100A. The control device 20 in the first embodiment acquires the speech signal X provided by the voice input device 24 and generates a response signal Y indicative of a response voice Vy directed toward the speech sound Vx. The reproduction device 26 reproduces a response voice Vy that corresponds to the response signal Y generated by the control device 20, and includes a D/A converter 262 and a sound output device 264. The D/A converter 262 converts the digital response signal Y generated by the control device 20 into an analog sound signal. The sound output device 264 (e.g., a loudspeaker or headphones) outputs a response voice Vy that corresponds to the converted sound signal in the form of sound waves. The reproduction device 26 may include processing circuitry, such as an amplifier that amplifies the response signal Y.

The storage device 22 stores a program executed by the control device 20 together with various data used by the control device 20. Any publicly known recording medium, such as a semiconductor recording medium or a magnetic recording medium, or a combination of recording media may be used as the storage device 22. The storage device 22 in the first embodiment stores sound signals Z indicative of response voices indicating particular speech contents. In the following description, an exemplary case is described in which the storage device 22 stores sound signals Z indicative of response voices, such as a response voice "un" serving as a backchannel, where a backchannel is an example of an interjection. The sound signals Z are recorded in advance, and can be stored in the storage device 22 as sound files in any format, such as a way format.

The control device 20 realizes functions (a voice acquirer 32, a voice analyzer 34A, and a response generator 36A) for establishing an interaction with the user U by executing the program stored in the storage device 22. Alternatively, the functions of the control device 20 may be realized by use of multiple devices (i.e., by a system), or a part of the functions of the control device 20 may be realized by dedicated electronic circuitry.

The voice acquirer 32 in FIG. 1 acquires a speech signal X that is indicative of a speech sound Vx. The voice acquirer 32 in the first embodiment acquires the speech signal X generated by the voice input device 24 from the voice input device 24. The voice analyzer 34A identifies a series of pitches (fundamental frequencies) P of the speech sound Vx from the speech signal X acquired by the voice acquirer 32. The voice analyzer 34A identifies the series of pitches Pat predetermined intervals. In other words, a pitch P is identified at each of different time points along a time-axis. Any publicly known technique may be used to identify the pitches P of the speech sound Vx. Here, the pitches P may be identified by extracting a sound component of a particular frequency band in the speech signal X. The frequency band that is to be analyzed by the voice analyzer 34A may be changed in accordance with an instruction (e.g., an instruction to specify a male voice or female voice) made by the user U, for example. Furthermore, the frequency band to be analyzed may be dynamically changed in accordance with the pitches P of the speech sound Vx.

The response generator 36A causes the reproduction device 26 to reproduce a response voice Vy directed to the speech sound Vx, which is represented by the speech signal X acquired by the voice acquirer 32. More specifically, with utterance of the speech sound Vx by the user U serving as a trigger, the response generator 36A generates a response signal Y indicative of the response voice Vy and provides the generated response signal Y to the reproduction device 26, thereby causing the reproduction device 26 to reproduce the response voice Vy. The response generator 36A in the first embodiment generates the response signal Y indicative of the response voice Vy by adjusting, in accordance with the pitches P of the speech sound Vx identified by the voice analyzer 34A, a prosody of the sound signal Z stored in the storage device 22. That is, the reproduction device 26 reproduces the response voice Vy that is an initial response voice represented by the sound signal Z having been adjusted in accordance with a prosody of the speech sound Vx.

In real-life interaction between humans, there is observed a tendency for an interacting partner of a speaker to utter a response voice directed to a speech sound uttered by the speaker at pitches that correspond to pitches that occur proximate to an end point of the speech sound of the speaker (that is, the pitches of the response voice depend on the pitches that occur proximate to the end point of the speech sound). In view of this tendency, the response generator 36A in the first embodiment generates the response signal Y indicative of the response voice Vy by adjusting pitches of the sound signal Z in accordance with the pitches P of the speech sound Vx identified by the voice analyzer 34A.

Figure 2:
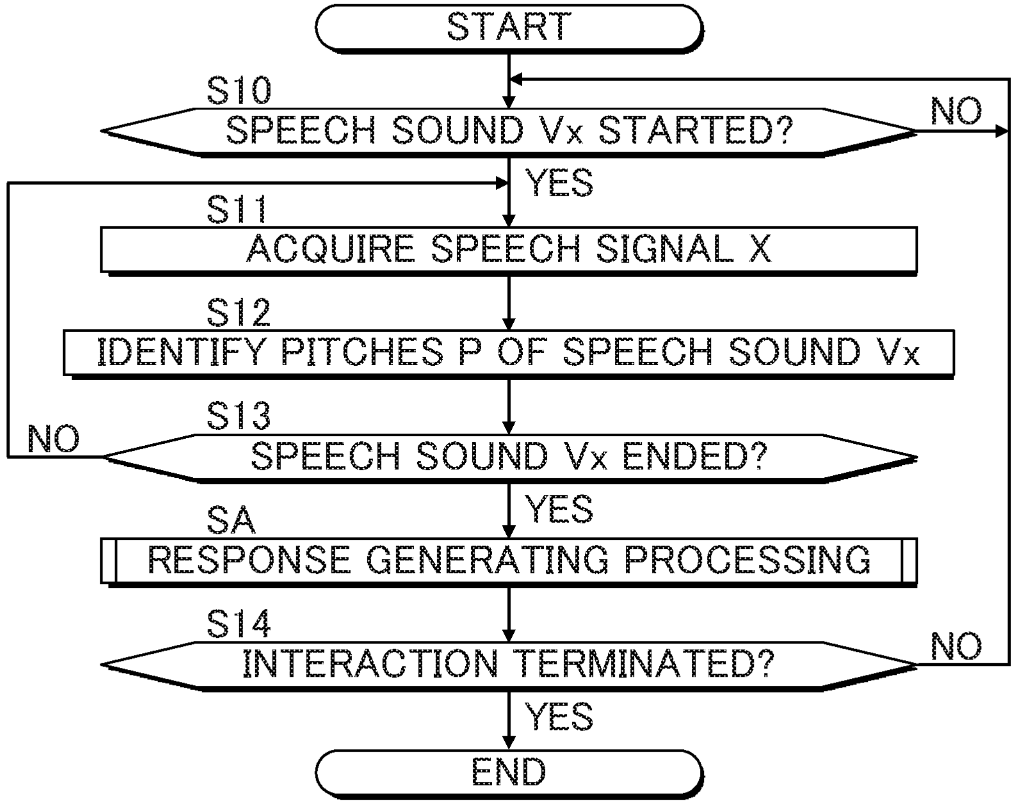
FIG. 2 is a flowchart showing operations carried out by the voice interaction apparatus of the first embodiment.

FIG. 2 is a flowchart showing processing executed by the control device 20 in the first embodiment. An instruction (e.g., instruction to activate a program for voice interaction) from the user U to the voice interaction apparatus 100A, for example, serves as a trigger for initiation of the processing shown in FIG. 2.

After the processing in FIG. 2 is initiated, the voice acquirer 32 waits until the user U starts to utter a speech sound Vx (S10:NO). More specifically, the voice acquirer 32 successively identifies volumes of a speech signal X provided by the voice input device 24, and in a case where a condition exists in which the volume is higher than a predetermined threshold value (e.g., a fixed value selected in advance or a variable value in accordance with an instruction from the user U), and is maintained for a predetermined length of time, the voice acquirer 32 determines that the speech sound Vx has started. Any method may be used to detect the start of the speech sound Vx (i.e., a start point of a speech section). For example, the voice acquirer 32 may determine that the speech sound Vx has started in a case where the volume of the speech signal X is higher than the threshold value and the voice analyzer 34A has detected a valid pitch P.

After the speech sound Vx has started (S10:YES), the voice acquirer 32 acquires the speech signal X from the voice input device 24 and stores the speech signal X in the storage device 22 (S11). The voice analyzer 34A identifies pitches P of the speech sound Vx from the speech signal X acquired by the voice acquirer 32, and stores the pitches Pin the storage device 22 (S12).

The voice acquirer 32 determines whether the user U has finished uttering the speech sound Vx (S13). More specifically, the voice acquirer 32 determines that the speech sound Vx has ended in a case where a condition in which the volume of the speech signal X is lower than a predetermined threshold value (e.g., a fixed value selected in advance or a variable value in accordance with an instruction made by the user U) is maintained for a predetermined length of time. Here, any publicly known technique may be used to detect the end of the speech sound Vx (i.e., an end point of the speech section). As will be understood from the above description, in a speech period during which utterance of the speech sound Vx continues (S13:NO), acquisition of the speech signal X by the voice acquirer 32 (S11) and identification of the pitches P of the speech sound Vx by the voice analyzer 34A (S12) are repeated.

Figure 3:
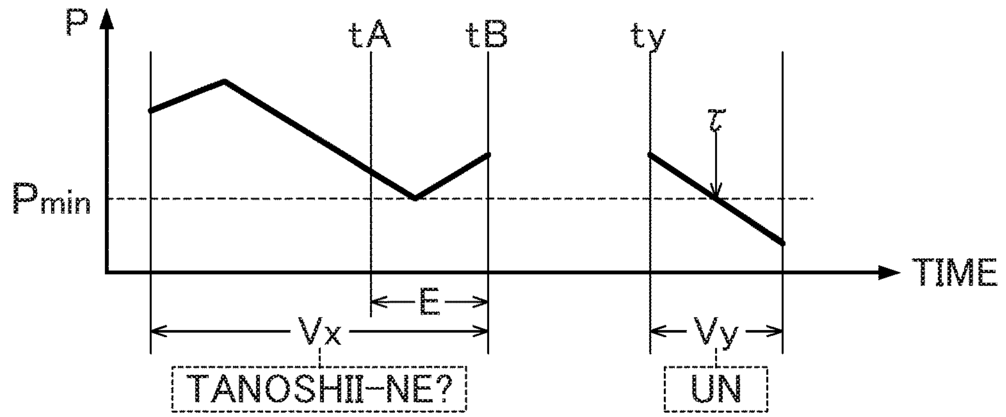
FIG. 3 is an explanatory diagram of a speech sound and a response voice in the first embodiment.
Figure 4:
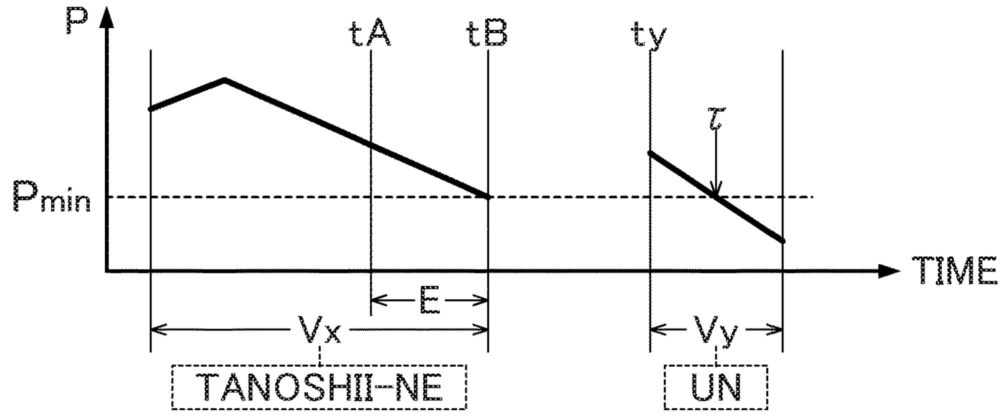
FIG. 4 is an explanatory diagram of a speech sound and a response voice in the first embodiment.

As a result of the processing described above, as shown in the examples of FIG. 3 and FIG. 4, a time series of pitches P of the speech sound Vx are identified during the speech section that is a period from the start point to the end point tB of the speech sound Vx. In FIG. 3, it is assumed that the user U has uttered the speech sound Vx of a question "tanoshii-ne?" ("it's fun, isn't it?" in English), where a speaker is asking about a speaking partner's perception, such as feelings or intentions. In FIG. 4, it is assumed that the user U has uttered the speech sound Vx of a declarative sentence in which a speaker expresses his/her own feelings or intentions, or a speaker is asking a speaking partner for his/her agreement.

After the speech sound Vx has ended (S13:YES), the response generator 36A executes processing (hereinafter referred to as "response generating processing") SA to cause the reproduction device 26 to reproduce a response voice Vy directed toward the speech sound Vx. As described above, in the response generating processing SA in the first embodiment, a response signal Y indicative of a response voice Vy is generated by adjusting pitches of the sound signal Z in accordance with the pitches P of the speech sound Vx identified by the voice analyzer 34A.

Figure 5:
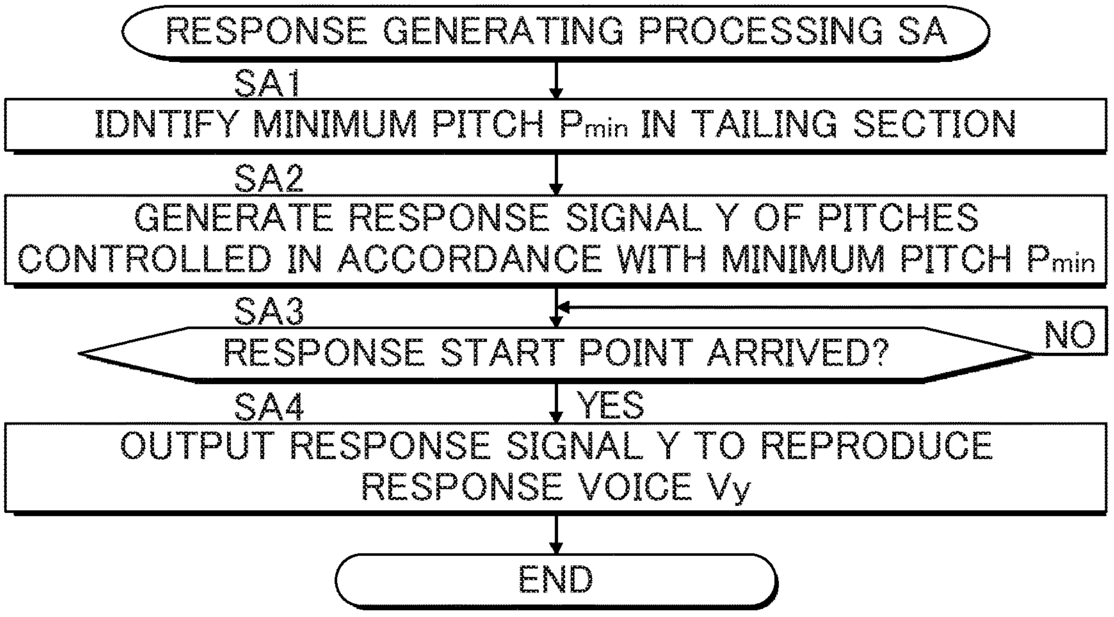
FIG. 5 is a flowchart showing response generating processing in the first embodiment.

FIG. 5 is a flowchart showing a specific example of the response generating processing SA. As described above, with the end of the speech sound Vx (S13:YES) serving as a trigger, the response generating processing SA of FIG. 5 is initiated. After initiation of the response generating processing SA, as shown in the examples in each of FIG. 3 and FIG. 4, the response generator 36A identifies, as a prosody of the speech sound Vx, a lowest pitch (hereinafter referred to as "minimum pitch") $P_{min}$ among pitches P identified by the voice analyzer 34A during a section (hereinafter referred to as "tailing section") E that is in the speech sound Vx and includes the end point tB of the speech sound Vx (SA1). The tailing section E, for example, is a section that is a part of the speech sound Vx, and extends over a predetermined period ending on the end point tB of the speech sound Vx. The time length of the tailing section E is set to be a value within a range from a few dozen milliseconds to a few seconds (e.g., somewhere around 180 milliseconds), for example. As will be apparent from FIG. 3, pitches P tend to increase proximate to the end point tB in the speech sound Vx representative of a question. Accordingly, the pitch P at a minimum point is identified as the minimum pitch $P_{min}$, wherein the minimum point is where a transition state of the pitches P of the speech sound Vx changes from a decrease to an increase. As will be apparent from FIG. 4, pitches P tend to decrease monotonically toward the end point tB in the speech sound Vx representative of a declarative sentence. Accordingly, the pitch P at the end point tB of the speech sound Vx is identified as the minimum pitch $P_{min}$.

The response generator 36A generates a response signal Y indicative of a response voice Vy of pitches controlled in accordance with the minimum pitch $P_{min}$ of the speech sound Vx (SA2). More specifically, as shown in FIG. 3 and FIG. 4, the response generator 36A generates the response signal Y indicative of the response voice Vy by adjusting pitches of the sound signal Z such that the pitch at a particular time point (hereinafter referred to as a "target point") τ along a time-axis within the response voice Vy corresponds to the minimum pitch $P_{min}$. In other words, the pitch at the target point τ in the response voice Vy is controlled in accordance with the minimum pitch $P_{min}$. A suitable example of the target point τ is a start point of a particular mora (typically a final mora) among morae that form the response voice Vy. As an example, a sound signal Z for a response voice "un" may be assumed. As will be apparent from FIG. 3 and FIG. 4, the response signal Y indicative of the response voice Vy is generated by adjusting (shifting) pitches in all sections in the sound signal Z such that the pitch at the start point (an initial pitch) of the final mora "n" in the sound signal Z corresponds to the minimum pitch $P_{min}$. Here, any publicly known technique may be used for adjustment of pitches. The target point τ is not limited to the start point of the final mora in the response voice Vy. For example, pitches may be adjusted with either the start point or the end point of the response voice Vy serving as the target point τ.

After generating the response signal Y by the above-described steps, the response generator 36A awaits arrival of a time point (hereinafter referred to as a "response start point") ty at which reproduction of the response voice Vy is to start (SA3:NO). The response start point ty may be, for example, a time point at which a predetermined time period (e.g., 150 ms) has passed since the end point tB of the speech sound Vx.

Upon arrival of the response start point ty (SA3:YES), the response generator 36A causes the reproduction device 26 to reproduce the response voice Vy by providing to the reproduction device 26 the response signal Y, which signal has been adjusted in accordance with the minimum pitch $P_{min}$ (SA4). That is, reproduction of the response voice Vy starts at the response start point ty at which point the predetermined period has passed since the end point tB of the speech sound Vx. Alternatively, the response generator 36A may cause the reproduction device 26 to reproduce the response voice Vy by sequentially providing, concurrently with generation (pitch shifting) of the response signal Y, the reproduction device 26 with the response signal Y from the response start point ty in real time. As will be understood from the above description, the response generator 36A in the first embodiment serves as an element that causes the reproduction device 26 to reproduce the response voice Vy of pitches controlled in accordance with the minimum pitch $P_{min}$ in the tailing section E of the speech sound Vx.

After the response generating processing SA described above is complete, as shown in FIG. 2, the control device 20 determines whether the user U has instructed termination of the voice interaction (S14). In a case where termination of the voice interaction has not been instructed (S14:NO), the processing transits to step S10. That is, with a start of the speech sound Vx (S10:YES) serving as a trigger, acquisition of the speech signal X by the voice acquirer 32 (S11), identification of the pitches P by the voice analyzer 34A (S12), and the response generating processing SA by the response generator 36A are executed. As will be understood also from the above description, each time a speech sound Vx is uttered, a response voice Vy of pitches that correspond to the pitches P of the speech sound Vx is reproduced. That is, voice interaction is realized in which utterance of a freely-chosen speech sound Vx by the user U and reproduction of a response voice Vy representative of a backchannel (e.g., response voice "un") directed toward the uttered speech sound Vx, are alternately repeated. After termination of the voice interaction is instructed by the user U (S14: YES), the control device 20 ends the processing shown in FIG. 2.

As described above, in the first embodiment, the reproduction device 26 reproduces the response voice Vy of pitches controlled in accordance with the minimum pitch $P_{min}$ of the tailing section E including the end point tB of the speech sound Vx. Accordingly, it is possible to realize natural voice interaction that is imitative of real-life interaction where an interacting partner tends to utter a response voice at pitches corresponding to pitches that occur proximate to the end point of a speech sound. In the first embodiment in particular, the response voice Vy is reproduced such that the pitch at the start point (target point $\tau$) of the final mora of the response voice Vy corresponds to the minimum pitch $P_{min}$. Thus, there is obtained a particularly remarkable advantageous effect where natural voice interaction that closely matches real-life interaction is realized.

Modifications of the First Embodiment (1) In the first embodiment, there is described an exemplary configuration in which a pitch at the target point $\tau$ in the response voice Vy is set to corresponds to the minimum pitch $P_{min}$ of the tailing section E in the speech sound Vx. It is of note, however, that a relationship between the pitch at the target point $\tau$ in the response voice Vy and the minimum pitch $P_{min}$ in the speech sound Vx is not limited to the above example (namely, where the pitches correspond to each other). For example, the pitch at the target point $\tau$ in the response voice Vy may be set to correspond to a pitch that results from addition or subtraction of a predetermined adjustment value (offset) $\delta p$ to or from the minimum pitch $P_{min}$. The adjustment value $\delta p$ is a pre-selected fixed value (e.g., a numerical value corresponding to an interval of a fifth, etc. relative to the minimum pitch $P_{min}$) or a variable value set in accordance with an instruction made by the user U. In a configuration in which the adjustment value $\delta p$ is set to be a numerical value corresponding to an integral multiple of an octave, the response voice Vy is reproduced at a pitch to which the minimum pitch $P_{min}$ is octave-shifted. Whether the adjustment value $\delta p$ is to be applied or not can be switched in accordance with an instruction made by the user U.

As will be understood from the above description, pitches of the response voice Vy may be said to follow the minimum pitch $P_{min}$. Here, that "the pitches of the response voice Vy follow the minimum pitch $P_{min}$" encompasses a case where the pitch at the target point $\tau$ in the response voice Vy corresponds to the minimum pitch $P_{min}$ and a case where the pitch at the target point $\tau$ corresponds to a pitch that results from addition or subtraction of a predetermined adjustment value $\delta p$ to or from the minimum pitch $P_{min}$.

(2) In the first embodiment, the pitches of the response voice Vy are controlled in accordance with the pitches P of the speech sound Vx (more specifically, the minimum pitch $P_{min}$ in the tailing section E). However, a type of a prosody of the speech sound Vx used for controlling a prosody of the response voice Vy and a type of a prosody of the response voice Vy controlled in accordance with a prosody of the speech sound Vx are not limited to pitches. For example, a prosody of the response voice Vy may be controlled in accordance with a volume (an example of prosody) of the speech sound Vx; or a prosody of the response voice Vy may be controlled in accordance with a range of variations in pitches or volumes (another example of prosody) of the speech sound Vx. Alternatively or additionally, a volume (an example of prosody) of the response voice Vy may be controlled in accordance with a prosody of the speech sound Vx; or a range of variations in pitches or volumes (another example of prosody) of the response voice Vy may be controlled in accordance with a prosody of the speech sound Vx.

(3) In real-life interaction between humans, a response voice prosody may not necessarily be determined solely in accordance with a prosody of a speech sound. In other words, while a tendency exists for a response voice prosody to depend on a speech sound prosody, the response voice prosody may vary with each speech sound utterance. Taking into account this tendency, the response generator 36A may cause a prosody (e.g., pitches or volume) of the response voice Vy reproduced by the reproduction device 26 to vary for each speech sound Vx. That is, in a case where a plurality of response voices Vy are reproduced in response to a plurality of speech sounds Vx, pitches of the plurality of response voices Vy are controlled differently for each of a plurality of speech signals X indicative of the plurality of speech sounds Vx. More specifically, as in the above-described modifications, in a configuration in which a pitch of the response voice Vy is adjusted to be a pitch that is derived by addition or subtraction of an adjustment value $\delta p$ to or from the minimum pitch $P_{min}$, the response generator 36A controls the adjustment value $\delta p$ to vary for each utterance of a speech sound Vx. For example, the response generator 36A causes a random number within a predetermined range to be generated for each utterance of a speech sound Vx, and sets the generated random number as the adjustment value δp. By this configuration, it is possible to realize natural voice interaction that is imitative of real-life interaction where a response voice prosody tends to vary for each speech sound utterance.

(4) In the first embodiment, the response signal Y is generated by adjusting pitches of a single type of the sound signal Z. However, multiple sound signals Z having different pitches may be used for generation of the response signal Y. For example, a configuration can be envisaged in which the response signal Y is generated by adjusting, from among multiple sound signals Z, the pitch of one sound signal Z, that is closest to the minimum pitch $P_{min}$ of the speech sound Vx.

Alternatively, one of the multiple sound signals Z having different pitches may be selectively used for reproduction of the response voice Vy. The sound signals Z are generated by recording voices that are uttered at different pitches; or are generated by adjusting the pitches of a voice uttered at a particular pitch. For example, multiple sound signals Z with pitches differing from each other by a predetermined interval (e.g., by 100 cent, which corresponds to a half-tone) are stored in advance in the storage device 22. The response generator 36A selects, for example, from among the multiple sound signals Z stored in the storage device 22, a sound signal Z with a pitch that is closest to the minimum pitch $P_{min}$ of the speech sound Vx as the response signal Y, and provides the reproduction device 26 with the selected sound signal Z, thereby causing the reproduction device 26 to reproduce the response voice Vy. As will be understood from the above description, adjustment of pitches of the sound signal Z by the response generator 36A may be omitted. In the above configuration where adjustment of the sound signal Z is omitted, an advantage is obtained in that a processing load imposed on the response generator 36A is reduced.

Considering that a sound range may differ between a speech signal X and a sound signal Z, a sound signal Z preferably may be selected from among the sound signals Z stored in the storage device 22, the sound signal Z having a pitch closest to one of pitches derived by shifting the minimum pitch $P_{min}$ of the speech sound Vx by a unit of an octave.

(5) In the first embodiment, the response voice Vy is reproduced by the reproduction device 26. Additionally, by provision of the speech signal X acquired by the voice acquirer 32 to the reproduction device 26, the speech sound Vx may also be reproduced by the reproduction device 26. Whether the speech sound Vx is to be reproduced by the reproduction device 26 or not may be switched in accordance with an instruction made by the user U.

Second Embodiment

A second embodiment of the present invention will now be described. In the exemplary modes described in the following, for elements whose effects or functions are similar to those in the first embodiment, like reference signs are used as in the first embodiment, and detailed explanations of such elements are omitted, as appropriate.

Figure 6:
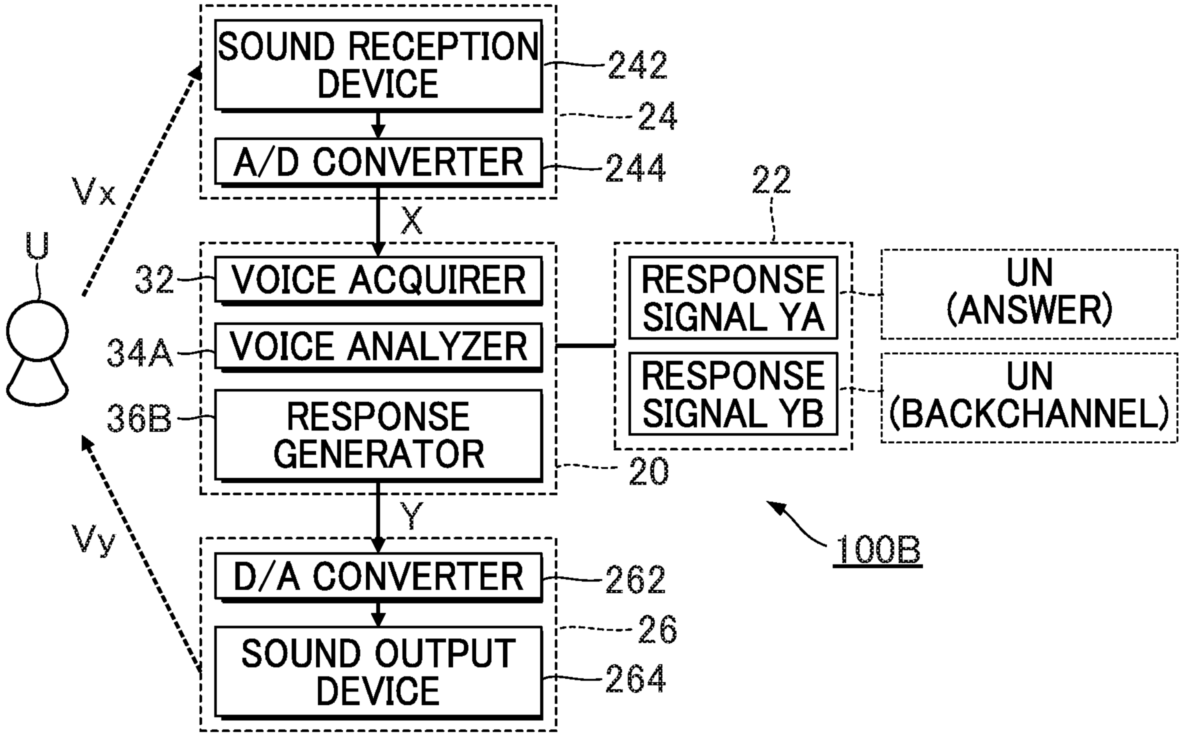
FIG. 6 is a diagram showing a configuration of a voice interaction apparatus in a second embodiment.

FIG. 6 is a diagram showing a configuration of a voice interaction apparatus 100B according to the second embodiment of the present invention. Similarly to the voice interaction apparatus 100A in the first embodiment, the voice interaction apparatus 100B in the second embodiment reproduces a response voice Vy directed toward a speech sound Vx uttered by the user U. As shown in the example in FIG. 6, in a configuration of the voice interaction apparatus 100B in the second embodiment, the response generator 36A in the voice interaction apparatus 100A in the first embodiment is replaced by a response generator 36B. Configurations and operations of other elements in the voice interaction apparatus 100B (the voice input device 24, the reproduction device 26, the voice acquirer 32, and the voice analyzer 34A) are similar to those in the first embodiment.

In real-life interaction between humans, there is observed a tendency for an interacting partner to utter a response voice with a prosody that corresponds to a content of speech (whether the speech consists of a question or a declarative sentence) uttered by a speaker. For example, a prosody differs between a response voice that is directed toward a question and a response voice that is directed toward a declarative sentence. More specifically, compared to a voice of a backchannel directed toward a declarative sentence, a voice of an answer directed toward a question tends to be uttered at a relatively high volume, and with an emphasized inflection (temporal variation in volume or in pitches); this occurs so as to enable the speaker to clearly recognize the answer (affirmative or negative) of a respondent, for example. Taking into account this tendency, the response generator 36B in the second embodiment causes the reproduction device 26 to reproduce the response voice Vy that has a prosody corresponding to the content (a question or a declarative sentence) of speech of the speech sound Vx.

Figure 7:
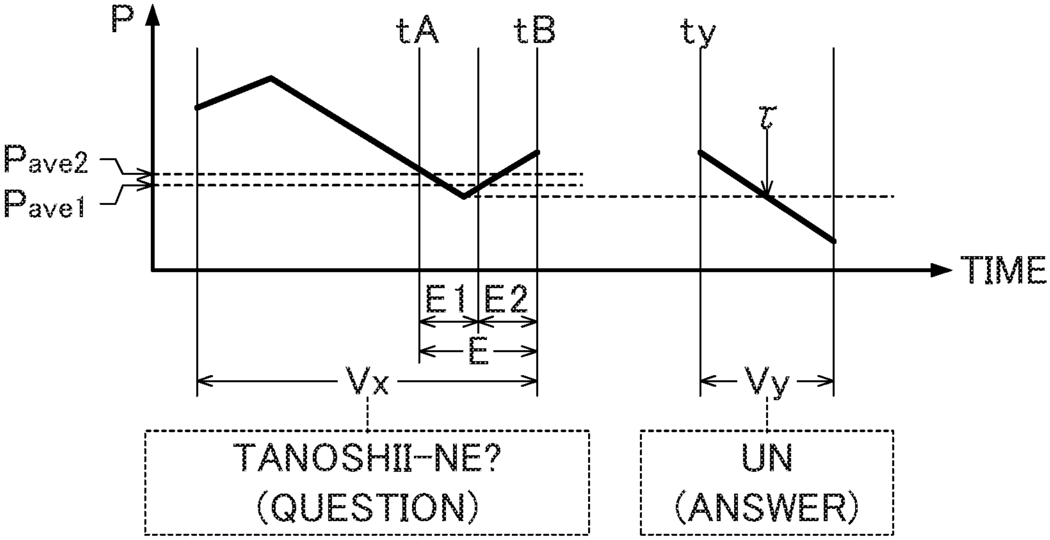
FIG. 7 is an explanatory diagram of a speech sound and a response voice in the second embodiment.
Figure 8:
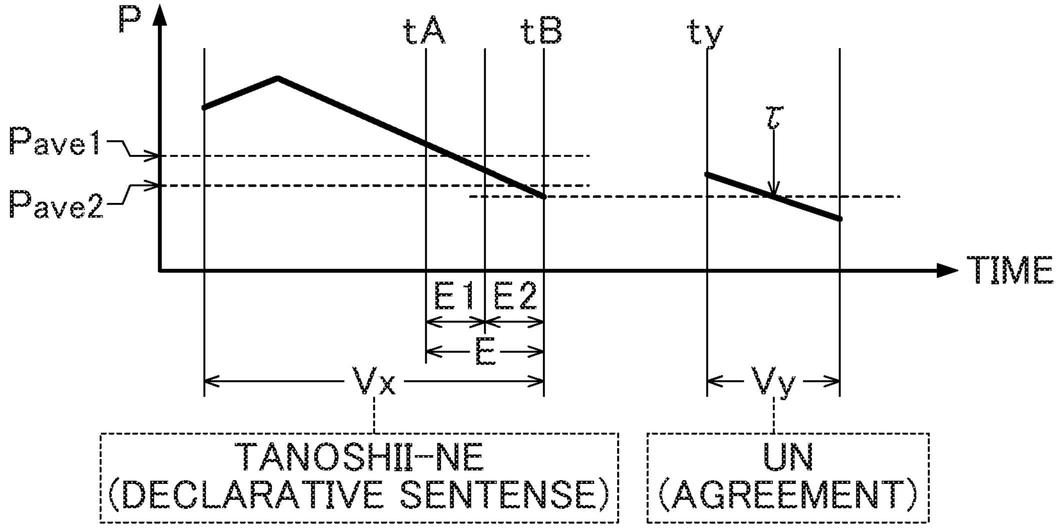
FIG. 8 is an explanatory diagram of a speech sound and a response voice in the second embodiment.

FIG. 7 shows an example of transition of the pitches P of the speech sound Vx representative of a question; and FIG. 8 shows an example of transition of the pitches P of the speech sound Vx representative of a declarative sentence. As will be apparent from FIG. 7 and FIG. 8, there is a tendency that transition (a tendency in temporal variation) of the pitches P that occur proximate to the end of the speech sound Vx differs depending on whether the content of speech of the speech sound Vx is representative of a question or a declarative sentence. More specifically, as shown in the example of FIG. 7, the pitches P of the speech sound Vx of a question decrease and then increase, or increase monotonically within the tailing section E. On the other hand, as shown in the example of FIG. 8, the pitches P of the speech sound Vx of a declarative sentence decrease monotonically from the start point to to the end point tB of the tailing section E. Accordingly, by analyzing the transition of the pitches P proximate to the end of the speech sound Vx (in the tailing section E), it is possible to estimate whether the content of the speech of the speech sound Vx corresponds to a question or to a declarative sentence.

Taking into account the above tendency, the response generator 36B in the second embodiment causes the reproduction device 26 to reproduce the response voice Vy that has a prosody corresponding to transition of the pitches Pin the tailing section E of the speech sound Vx (i.e., a question or a declarative sentence). More specifically, as shown in the example of FIG. 7, in a case where the transition state of the pitches P of the speech sound Vx changes from a decrease to an increase within the tailing section E or in a case where the pitches P of the speech sound Vx increase monotonically in the tailing section E (i.e., in a case where the content of speech is inferred to be a question), the response voice Vy with a prosody appropriate for a question is reproduced by the reproduction device 26. On the other hand, as shown in the example of FIG. 8, in a case where the pitches P of the speech sound Vx decrease monotonically within the tailing section E (i.e., in a case where the content of speech is inferred to be a declarative sentence), the response voice Vy with a prosody appropriate for a declarative sentence is reproduced by the reproduction device 26.

As shown in the example of FIG. 6, the storage device 22 of the voice interaction apparatus 100B in the second embodiment stores a response signal YA and a response signal YB that each represent a response voice Vy of a particular speech content recorded in advance. Between the response signal YA and the response signal YB, literation of the speech content is common, but their respective prosodies differ. In an interaction in Japanese for example, a response voice Vy represented by the response signal YA is a voiced sound "un" uttered with an intention to convey an affirmative answer to the speech sound Vx of a question; and a response voice Vy represented by the response signal YB is a voiced sound "un" uttered with an intention to convey a backchannel directed toward the sound speech Vx of a declarative sentence. More specifically, the volume of the response voice Vy of the response signal YA is higher than that of the response voice Vy of the response signal YB; and there exists in the prosody a difference that the response voice Vy of the response signal YA has a wider range of variations in volume and pitches (i.e., inflection) than the response voice Vy of the response signal YB. The response generator 36B in the second embodiment selectively provides the reproduction device 26 with one of the response signal YA and the response signal YB stored in the storage device 22, thereby causing the reproduction device 26 to selectively reproduce one of the response voices Vy with different prosodies. Here, the content of utterance may differ between the response signal YA and the response signal YB. Although the above description explains an interaction in Japanese, similar circumstances can be envisaged with languages other than Japanese. For example, in a case where an interaction in English is assumed, a voiced sound "yeah" uttered with an intention to convey an affirmative answer to the speech sound Vx of a question; and a voiced sound "yeah" uttered with an intention to convey a backchannel directed toward the sound speech Vx of a declarative sentence, have a speech content in common with each other, but may differ in their prosodies.

Figure 9:
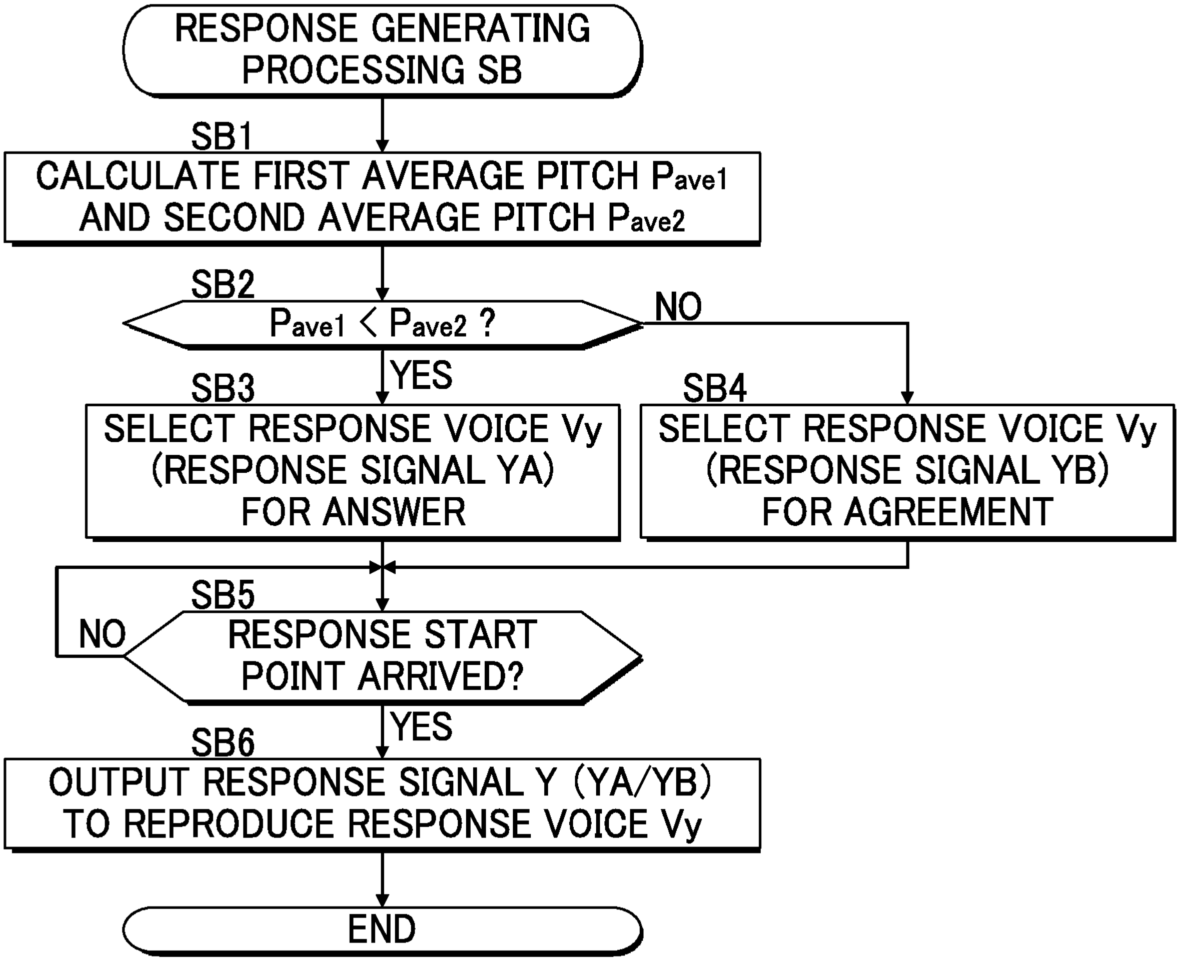
FIG. 9 is a flowchart showing response generating processing in the second embodiment.

FIG. 9 is a flowchart showing response generating processing SB for the response generator 36B of the second embodiment that causes the reproduction device 26 to reproduce a response voice Vy. In the second embodiment, the response generating processing SA of FIG. 2 shown as an example in the first embodiment is replaced by the response generating processing SB of FIG. 9. Processing other than the response generating processing SB is similar to that described in the first embodiment. The response generating processing SB of FIG. 9 is initiated with an end of the speech sound Vx serving as a trigger (S13:YES).

After initiating the response generating processing SB, the response generator 36B calculates an average (hereinafter referred to as "first average pitch") $P_{ave1}$ of pitches P in a first section E1 and an average (hereinafter referred to as "second average pitch") $P_{ave2}$ of pitches P in a second section E2 (SB1), the first section E1 and the second section E2 being within the tailing section E of the speech sound Vx. As shown in the examples of FIG. 7 and FIG. 8, the first section E1 is a front section within the tailing section E (e.g., a section that includes the start point to of the tailing section E); and the second section E2 is a section that comes after the first section E1 within the tailing section E (e.g., a section that includes the end point tB of the tailing section E). More specifically, the first half of the tailing section E is defined as the first section E1, and the second half of the tailing section E is defined as the second section E2. However, the definition of the first section E1 and the second section E2 is not limited to the above example. For instance, the second section E2 may follow the first section E1 with an interval therebetween, or a time length of the first section E1 and that of the second section E2 may be different.

The response generator 36B compares the first average pitch $P_{ave1}$ of the first section E1 with the second average pitch $P_{ave2}$ of the second section E2, and determines whether the first average pitch $P_{ave1}$ is lower than the second average pitch $P_{ave2}$ (SB2). As described above, the transition state of the pitches P of the speech sound Vx of a question tends to change from a decrease to an increase, or the pitches P tend to monotonically increase, within the tailing section E. Accordingly, as shown in the example in FIG. 7, the first average pitch $P_{ave1}$ is likely to be lower than the second average pitch $P_{ave2}$ ($P_{ave1}<P_{ave2}$). The pitches P of the speech sound Vx of a declarative sentence tend to monotonically decrease within the tailing section E. Accordingly, as shown in the example in FIG. 8, the first average pitch $P_{ave1}$ is likely to be higher than the second average pitch $P_{ave2}$ ($P_{ave1}>P_{ave2}$).

In view of the above tendencies, in a case where the first average pitch $P_{ave1}$ is lower than the second average pitch $P_{ave2}$ (SB2:YES), that is, in a case where the speech sound Vx is likely to be representative of a question, the response generator 36B of the second embodiment selects from the storage device 22 a response signal YA corresponding to a response voice Vy representative of an answer to the question (SB3). In a case where the first average pitch $P_{ave1}$ is higher than the second average pitch $P_{ave2}$ (SB2:NO), that is, in a case where the speech sound Vx is likely to be representative of a declarative sentence, the response generator 36B selects from the storage device 22 a response signal YB corresponding to a response voice Vy representative of agreement with the declarative sentence (SB4).

After selecting a response signal Y (YA or YB) that is in accordance with the transition of the pitches P of the speech sound Vx by the above steps, similarly to the first embodiment, the response generator 36B provides the response signal Y to the reproduction device 26 upon arrival of the response start point ty (SB5:YES), thereby causing the reproduction device 26 to reproduce the response voice Vy (SB6). More specifically, in a case where the pitches P of the speech sound Vx decrease and then increase within the tailing section E, or the pitches P of the speech sound Vx monotonically increase within the tailing section E (SB2:YES), a response voice Vy representative of an answer to a question is reproduced. In a case where the pitches P of the speech sound Vx monotonically decrease within the tailing section E (SB2:NO), a response voice Vy representative of agreement with a declarative sentence is reproduced. In other words, a prosody of the response voice Vy that is reproduced by the reproduction device 26 differs between a case where the speech sound Vx is representative of a question and a case where the speech sound Vx is representative of a declarative sentence.

Acquisition of the speech signal X by the voice acquirer 32 (S11), identification of the pitches P by the voice analyzer 34A (S12), and the response generating processing SB by the response generator 36B are repeated until termination of the voice interaction is instructed from the user U (S14:NO). Accordingly, similarly to the first embodiment, voice interaction is realized in which utterance of a freely-chosen speech sound Vx by the user U and reproduction of a response voice Vy directed toward the speech sound Vx are alternately repeated.

As described above, in the second embodiment, there is reproduced by the reproduction device 26 a response voice Vy that has a prosody corresponding to transition of the pitches P in the tailing section E of the speech sound Vx. Accordingly, it is possible to realize natural voice interaction that is imitative of real-life interaction where an interacting partner of a speaker tends to utter a response voice with a prosody that is in accordance with the content of speech of the speaker. In the second embodiment in particular, the prosody of a response voice Vy differs between a case where a transition state of the pitches P in the tailing section E changes from a decrease to an increase or the pitches P monotonically increase in the tailing section E; and a case where the pitches P monotonically decrease from the start point tA to the end point tB of the tailing section E. Thus, it is possible to realize natural voice interaction that is imitative of real-life interaction where the prosody of a response voice tends to differ between a case where the speech sound is representative of a question and a case where the speech sound is representative of a declarative sentence.

Furthermore, in the second embodiment, the prosody of the response voice Vy is changed in accordance with a result of a comparison between the first average pitch $P_{ave1}$ of the first section E1 within the tailing section E and the second average pitch $P_{ave2}$ of the second section E2 within the tailing section E. Accordingly, an advantage is obtained in that the transition of the pitches P can be evaluated (thus the prosody of the response voice Vy can be selected) by simple processing involving averaging and comparing pitches P.

Modifications of the Second Embodiment (1) In the second embodiment, the reproduction device 26 is selectively provided with one of response signals Y (YA and YB) that are stored in advance in the storage device 22. Alternatively, the response generator 36B may generate a response signal Y that has a prosody corresponding to transition of the pitches P within the tailing section E of a speech sound Vx by adjusting a single response signal Y that is recorded in advance. For example, it is assumed that the storage device 22 stores a response signal YA indicative of a response voice Vy directed toward a declarative sentence. In a case where the speech sound Vx is representative of a question, the response generator 36B increases a volume of the response signal YA and widens the range of variation in the volume and the pitches of the response signal YA, thereby generating a response signal YB representative of a response voice Vy of an answer. In a case where the speech sound Vx is representative of a declarative sentence, the response generator 36B provides the response signal YA to the reproduction device 26. Alternatively, the response generator 36B may generate a response signal YA indicative of a response voice Vy that is representative of agreement with a declarative sentence. Such response signal YA may be generated by decreasing a volume of an initial response signal Y and decreasing a range of variation in the volume and the pitches of the initial response signal Y.

In a configuration in which response signals Y with different prosodies are generated by adjustment of a single response signal Y, since there is no need for the storage device 22 to store response signals Y (YA and YB) with different prosodies, an advantage is obtained in that a required storage capacity of the storage device 22 can be reduced. In a configuration of the second embodiment in which one of response signals Y with different prosodies is selectively used, since there is no need to adjust the prosody of the initial response signal Y in accordance with the content of speech represented by the speech sound Vx, an advantage is obtained in that a processing load on the response generator 36B is reduced.

(2) In the second embodiment, comparison is made between the first average pitch $P_{ave1}$ in the first section E1 and the second average pitch $P_{ave2}$ in the second section E2, the first section E1 and the second section E2 being within the tailing section E. However, a method to infer whether the content of speech represented by the speech sound Vx corresponds to a question or to a declarative sentence is not limited to the above example. For example, since pitches P decrease monotonically in the tailing section E in the speech sound Vx of a declarative sentence, the pitch P tends to reach the minimum pitch $P_{min}$ at the end point tB of the tailing section E. Accordingly, in a case where a time length of a section that is within the tailing section E and comes after a time point at which the pitch P reaches the minimum pitch $P_{min}$ is sufficiently shorter (e.g., lower than a predetermined threshold value) than a section in the front, the content of the speech represented by the speech sound Vx may be inferred to correspond to a declarative sentence. Alternatively, in accordance with transition of the pitches P before and after the time point corresponding to the minimum pitch $P_{min}$ within the tailing section E, it can be inferred whether the content of speech represented by the speech sound Vx corresponds to a question or to a declarative sentence. For example, in a case where the pitches P increase after the time point of the minimum pitch $P_{min}$ within the tailing section E, the response generator 36B infers that the content of speech represented by the speech sound Vx corresponds to a question.

Third Embodiment

Figure 10:
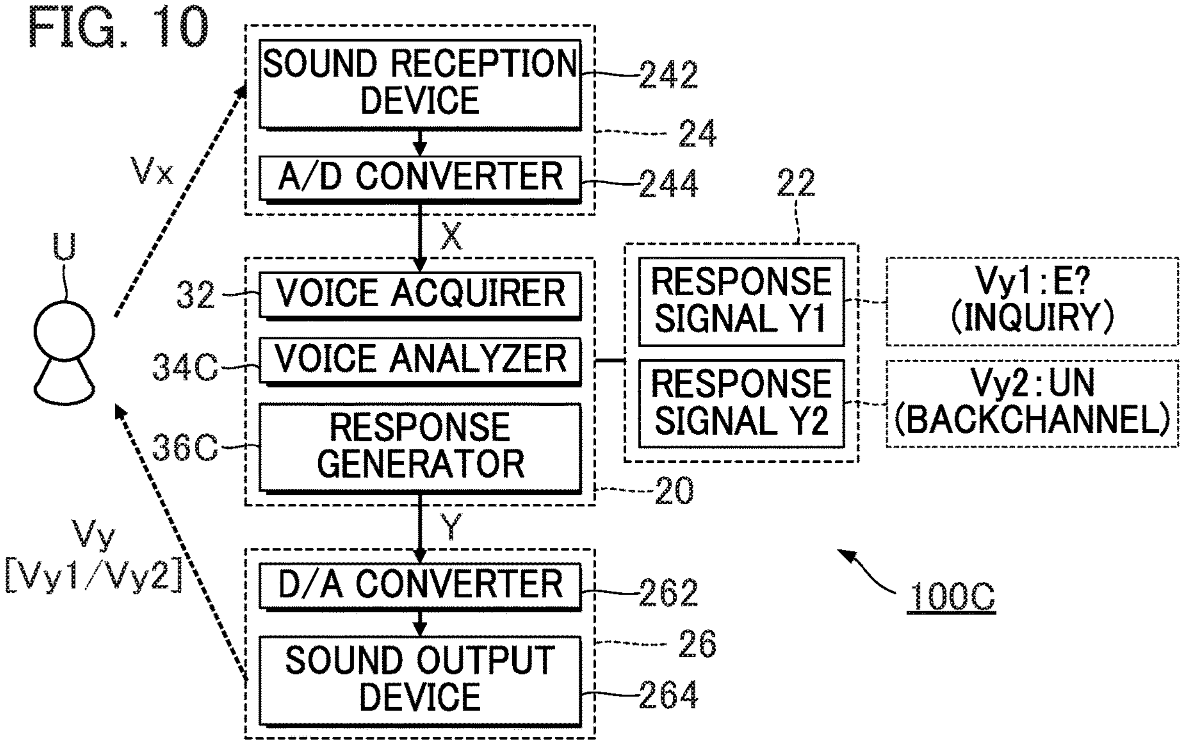
FIG. 10 is a diagram showing a configuration of a voice interaction apparatus in a third embodiment.

FIG. 10 is a diagram showing a configuration of a voice interaction apparatus 100C according to a third embodiment of the present invention. The voice interaction apparatus 100C in the third embodiment reproduces a response voice Vy directed toward a speech sound Vx uttered by the user U, similarly to the voice interaction apparatus 100A in the first embodiment. In the third embodiment, in addition to a response voice (hereinafter referred to as "second response voice") Vy2 representative of an answer or a backchannel directed toward the speech sound Vx, a response voice (hereinafter referred to as "first response voice") Vy1 representative of an inquiry directed toward the sound speech Vx can be reproduced by the reproduction device 26. The first response voice Vy1 is a voiced sound, such as "e?" ("pardon?" in English), or "nani?" ("sorry?" in English), which is uttered to prompt the speaker to repeat the speech sound Vx. As shown in the example in FIG. 10, the storage device 22 in the voice interaction apparatus 100C of the third embodiment stores a response signal Y1 that is indicative of the recorded first response voice Vy1 representative of an inquiry and a response signal Y2 that is indicative of the recorded second response voice Vy2 representative of a response other than an inquiry (e.g., a backchannel such as "un"). In the third embodiment, a response voice Vy to be reproduced is selected from among the first response voice Vy1 and the second response voice Vy2.

As shown in the example of FIG. 10, the voice interaction apparatus 100C of the third embodiment is configured in a manner such that the voice analyzer 34A and the response generator 36A in the voice interaction apparatus 100A of the first embodiment are replaced with a voice analyzer 34C and a response generator 36C. Configurations and operations of other elements (the voice input device 24, the reproduction device 26, and the voice acquirer 32) in the voice interaction apparatus 100C are similar to those in the first embodiment.

The voice analyzer 34C of the third embodiment identifies a prosody index value Q from the speech signal X acquired by the voice acquirer 32. The prosody index value Q is an index value related to a prosody of the speech sound Vx, and is calculated for each speech sound Vx (for each unit, where a series of speech from a start point to an end point of the speech sound Vx is deemed to be a unit). More specifically, an average value of pitches, an extent of variation in the pitches, an average value of the volume, or an extent of variation in the volume, in a speech section of the speech sound Vx, is calculated as the prosody index value Q from the speech signal X. As described above, the response generator 36C of the third embodiment causes the reproduction device 26 to selectively reproduce either the first response voice Vy1, which is representative of an inquiry directed toward the speech sound Vx, or the second response voice Vy2, which is representative of a response other than an inquiry.

In real-life interaction between humans, when a prosody of a speech sound uttered by a speaker changes, it tends to become difficult for an interacting partner to catch the speech sound, and thus there is increasing tendency for the interacting partner to make an inquiry. More specifically, in a case where a prosody of a speech sound of a speaker deviates from a tendency of past prosodies for the speaker (e.g., in a case where a volume of an actual speech sound is low compared to a volume anticipated by the interacting partner judged from prior tendencies), it is likely that the interacting partner will not be able to adequately catch the speech sound, thus giving rise to an inquiry being directed to the speaker. In view of the above tendencies, the response generator 36C of the third embodiment compares the prosody index value Q identified by the voice analyzer 34C with a threshold value $Q_{TH}$, and in accordance with a result of the comparison, the response generator 36C causes the reproduction device 26 to reproduce either the first response voice Vy1 or the second response voice Vy2. The threshold value $Q_{TH}$ is set to be a representative value (e.g., an average value) of prosody index values Q of multiple speech sounds Vx uttered at different timings by the user U in the past (i.e., a representative value of prosody index values Q identified from a plurality of speech signals X acquired by the voice acquirer 32 in the past). That is, the threshold value $Q_{TH}$ corresponds to a standard prosody that is estimated from prior speeches of the user U. In a case where the prosody index value Q of the speech sound Vx deviates from the threshold value $Q_{TH}$, the first response voice Vy1 representative of an inquiry is reproduced; while in a case where the prosody index value Q is close to the threshold value $Q_{TH}$, the second response voice Vy2 representative of a backchannel is reproduced.

Figure 11:
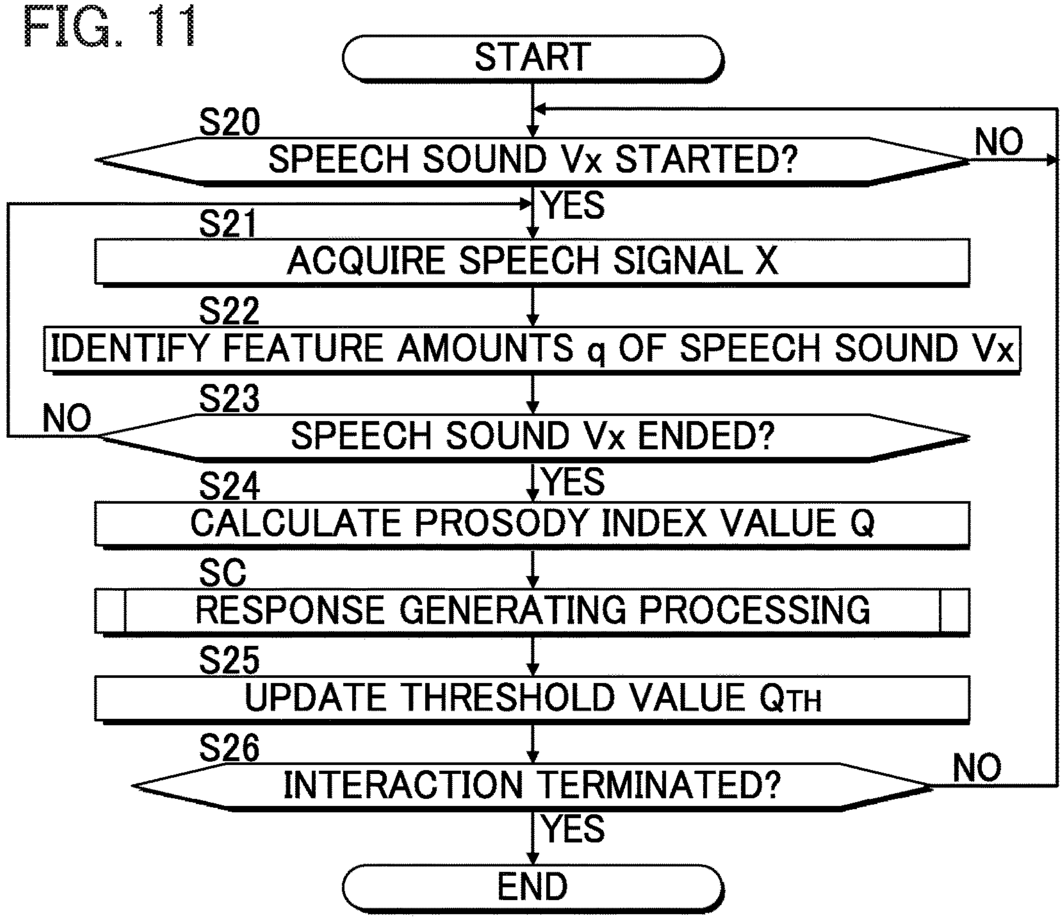
FIG. 11 is a flowchart showing operations carried out by the voice interaction apparatus in the third embodiment.

FIG. 11 is a flowchart showing processing executed by the control device 20 of the third embodiment. For example, with an instruction (e.g., instruction to activate a program for voice interaction) issued to the voice interaction apparatus 100C by the user U serving as a trigger, the processing shown in FIG. 11 is initiated.

Similarly to the first embodiment, after a speech sound Vx has started (S20:YES), the voice acquirer 32 acquires a speech signal X from the voice input device 24 and stores the speech signal X in the storage device 22 (S21). The voice analyzer 34C identifies a series of feature amounts q related to a prosody of the speech sound Vx from the speech signal X acquired by the voice acquirer 32 (S22). The feature amount q is for example a pitch P or a volume of the speech sound Vx. Acquisition of the speech signal X by the voice acquirer 32 (S21) and identification of the feature amounts q by the voice analyzer 34C (S22) are repeated until the end of the speech sound Vx (S23:NO). That is, during a speech section from the start point to the end point tB of the speech sound Vx, a time series of feature amounts q for the speech sound Vx are identified.

After the speech sound Vx ends (S23:YES), the voice analyzer 34C calculates a prosody index value Q from the time series of feature amounts q identified for the speech section from the start point to the end point of the speech sound Vx (S24). More specifically, the voice analyzer 34C calculates, as the prosody index value Q, an average value or an extent of variation (a range) of the feature amounts q within the speech section.

After the prosody index value Q is calculated for the speech sound Vx by the above-described processing, the response generator 36C executes response generating processing SC for causing the reproduction device 26 to reproduce a response voice Vy. In the response generating processing SC in the third embodiment, the response generator 36C causes the reproduction device 26 to selectively reproduce either the first response voice Vy1 or the second response voice Vy2 in accordance with the prosody index value Q calculated by the voice analyzer 34C.

After the response generating processing SC has completed, the voice analyzer 34C updates the threshold value $Q_{TH}$ in accordance with the prosody index value Q of the speech sound Vx for this time (S25). More specifically, the voice analyzer 34C calculates, as the updated threshold value $Q_{TH}$, a representative value (e.g., an average value or a median value) of prosody index values Q of past speech sounds Vx including the speech sound Vx for this time. For example, as expressed by the following equation (1), a weighted average (index moving average) of the prosody index value Q for this time and the pre-update threshold value $Q_{TH}$ is calculated as the updated threshold value $Q_{TH}$. Sign α in the equation (1) indicates a predetermined positive number below one (forgetting coefficient).

$$Q_{TH}=\alpha\cdot Q+(1-\alpha)Q_{TH} \tag{1}$$

As will be understood from the above description, the voice analyzer 34C of the third embodiment serves as an element that sets a representative value of prosody index values Q in the past speech sounds Vx as a threshold value $Q_{TH}$. For each utterance of a speech sound Vx, the threshold value $Q_{TH}$ is updated to a value that reflects the prosody index value Q of the speech sound Vx, and the threshold value $Q_{TH}$ consequently becomes a value that corresponds to a standard prosody estimated from the speech of the user U at different timings. Alternatively, the threshold value $Q_{TH}$ may be fixed at a predetermined value. For example, an average value of prosody index values Q identified from speech sounds of many and unspecified speakers may be set as a threshold value $Q_{TH}$.

Acquisition of a speech signal X by the voice acquirer 32 (S21), calculation of a prosody index value Q by the voice analyzer 34C (S22 and S24), the response generating processing SC by the response generator 36C, and updating of the threshold value $Q_{TH}$ by the voice analyzer 34C (S25) are repeated for each utterance of a speech sound Vx until termination of voice interaction is instructed by the user U (S26:NO). Accordingly, voice interaction is realized in which utterance of a speech sound Vx by the user U and selective reproduction of the first response voice Vy1 (inquiry) or the second response voice Vy2 (backchannel) are alternately repeated.

Figure 12:
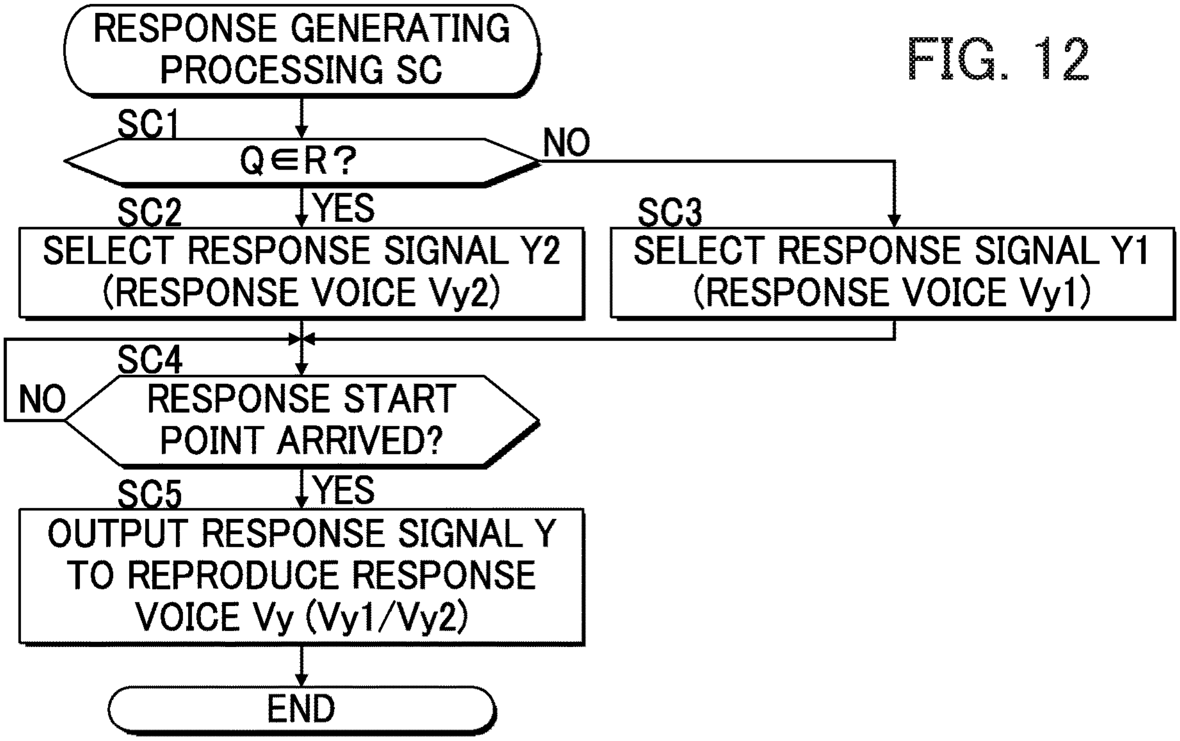
FIG. 12 is a flowchart showing response generating processing in the third embodiment.
Figure 13:
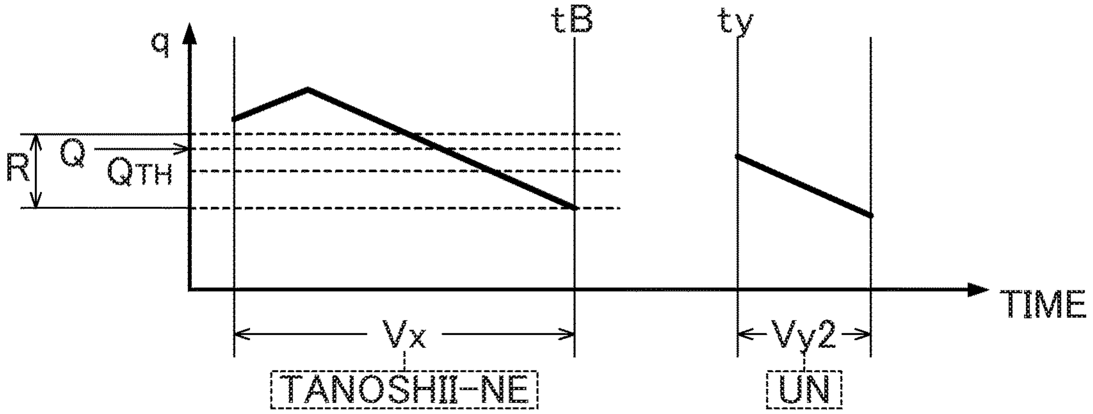
FIG. 13 is an explanatory diagram of a speech sound and a response voice in the third embodiment.
Figure 14:
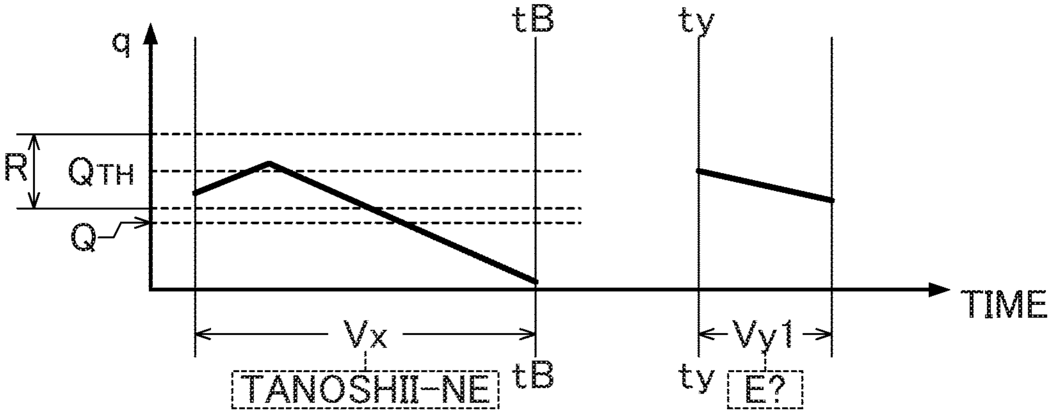
FIG. 14 is an explanatory diagram of a speech sound and a response voice in the third embodiment.

FIG. 12 is a flowchart showing the response generating processing SC in the third embodiment. After initiating the response generating processing SC, the response generator 36C compares the prosody index value Q identified by the voice analyzer 34C with the threshold value $Q_m$ at the current stage, and determines whether the prosody index value Q is included in a predetermined range (hereinafter referred to as "accepted range") R that includes the threshold value $Q_{TH}$ (SC1). In FIG. 13 and FIG. 14 there are shown exemplary transitions of the feature amounts q identified from the speech sound Vx by the voice analyzer 34C. As shown in FIG. 13 and FIG. 14, the accepted range R is a range with a predetermined width having the threshold value $Q_{TH}$ as the median value. Processing carried out to compare the prosody index value Q with the threshold value $Q_{TH}$ (SC1) may be realized as processing that determines whether an absolute value of a difference between the prosody index value Q and the threshold value $Q_{TH}$ is higher than a predetermined value (e.g., a half of the range width of the accepted range R).

In FIG. 13, it is assumed that the prosody index value Q is a value within the accepted range R. If the prosody index value Q is included in the accepted range R, this means that the prosody of the speech sound Vx for this time is close to the standard prosody (tendencies in prior speeches) of the user U. That is, assuming a situation in real-life interaction between humans, the situation can be evaluated as one in which it is easy for an interacting partner to catch the speech sound (a situation that is unlikely to require an inquiry to be directed to a speaker). In view of this, in a case where the prosody index value Q is a value within the accepted range R (SC1:YES), the response generator 36C selects from the storage device 22 a response signal Y2 indicative of a second response voice Vy2 representative of a backchannel directed toward the speech sound Vx (SC2).

In FIG. 14, it is assumed that the prosody index value Q is a value outside the accepted range R (more specifically, a value lower than the lower limit of the accepted range R). If the prosody index value Q is not included in the accepted range R, this means that the prosody of the speech sound Vx for this time deviates from the standard prosody of the user U. That is, assuming a situation in real-life interaction between humans, the situation can be evaluated as one in which it is difficult for an interacting partner to catch the speech sound (a situation that is likely to require an inquiry to be directed to a speaker). In view of this, in a case where the prosody index value Q is a value outside the accepted range R (SC1:NO), the response generator 36C selects from the storage device 22 a response signal Y1 indicative of a second response voice Vy1 (e.g., a voiced sound such as "e?" or "nani?") that is representative of an inquiry directed toward the speech sound Vx, as a signal to be provided to the reproduction device 26 (SC3).

After selecting a response signal Y that is in accordance with the prosody index value Q (selecting a response voice Vy to be reproduced), similarly to the first embodiment, the response generator 36C provides the response signal Y to the reproduction device 26 upon arrival of the response start point ty (SC4:YES), thereby causing the reproduction device 26 to reproduce the response voice Vy (the first response voice Vy1 or the second response voice Vy2) (SC5). In other words, in a case where the prosody index value Q is included in the accepted range R, the second response voice Vy2 representative of a backchannel is reproduced, and in a case where the prosody index value Q is not included in the accepted range R, the first response voice Vy1 representative of an inquiry is reproduced.

As described above, in the third embodiment, either the first response voice Vy1 representative of an inquiry directed toward the speech sound Vx or the second response voice Vy2 representative of a response other than an inquiry, is selectively reproduced by the reproduction device 26. Accordingly, it is possible to realize natural voice interaction that is imitative of real-life interaction where there tends to arise on occasion an inquiry (request for repetition of speech) directed to a speaker, in addition to a backchannel directed to the speech of the speaker.

Additionally, in the third embodiment, either the first response voice Vy1 or the second response voice Vy2 is selected in accordance with a result of comparison between the threshold value $Q_{TH}$ and the prosody index value Q representative of the prosody of the speech sound Vx. Accordingly, it is possible to realize natural voice interaction that is imitative of real-life interaction where there is a tendency that, when the prosody of the speech sound changes unexpectedly, catching the speech sound becomes difficult and a necessity to make an inquiry increases. In the third embodiment in particular, a representative value of prosody index values Q of past speech sounds Vx is set as the threshold value $Q_{TH}$. Accordingly, an advantage is obtained in that natural voice interaction is realized that is imitative of real-life interaction where there is a tendency that, in a case where a prosody of the speech sound of a speaker deviates from the standard prosody of the speaker (i.e., from the prosody anticipated by an interacting partner), it is likely that the interacting partner will make an inquiry. Furthermore, the first response voice Vy1 is selected in a case where the prosody index value Q is a value outside the accepted range R including the threshold value $Q_{TH}$, and the second response voice Vy2 is selected in a case where the prosody index value Q is a value within the accepted range R. Accordingly, compared to an exemplary configuration in which one of the first response voice Vy1 and the second response voice Vy2 is selected in accordance with a magnitude of the prosody index value Q relative to the threshold value $Q_{TH}$ alone, it is possible to reduce a possibility of the first response voice Vy1 being reproduced at an excessively high frequency (i.e., possible to reproduce the first response voice Vy1 at an appropriate frequency).

Modifications of the Third Embodiment

In the third embodiment, reproduction of the first response voice Vy1 or reproduction of the second response voice Vy2 is selected in accordance with the prosody index value Q of the speech sound Vx. Alternatively, the first response voice Vy1 representative of an inquiry may be reproduced at a predetermined frequency, regardless of characteristics of the speech sound Vx. More specifically, the response generator 36C causes the reproduction device 26 to reproduce the first response voice Vy1 representative of an inquiry in response to speech sounds Vx that are randomly selected from speech sounds Vx uttered in series by the user U, and causes the reproduction device 26 to reproduce the second response voice Vy2 representative of a backchannel in response to other speech sounds Vx. For example, the response generator 36C may generate a random number that falls within a predetermined range for each utterance of a speech sound Vx. In a case where the random number is greater than a threshold value, the response generator 36C selects the first response voice Vy1; and in a case where the random number is lower than the threshold value, the response generator 36C selects the second response voice Vy2. In the modification described above, since the first response voice Vy1 representative of an inquiry is reproduced in response to speech sounds Vx that are randomly selected from speech sounds Vx, it is possible to realize natural voice interaction that is imitative of real-life voice interaction where an inquiry directed toward a speech sound tends to occur randomly.

In the above configuration, the response generator 36C may change a ratio of a number of times the first response voice Vy1 is reproduced (i.e., a frequency of reproducing the first response voice Vy1) to the number of times a speech sound Vx is uttered. For example, by adjusting the threshold value, which is compared with the random number, the response generator 36C controls a frequency of reproduction of the first response voice Vy1. For example, in a case where the frequency of reproducing the first response voice Vy1 is set at 30%, the first response voice Vy1 is reproduced for 30% of the total number of utterances of the speech sound Vx, and the second response voice Vy2 is reproduced for the remaining 70%, out of the total number of utterances of the speech sound Vx. The frequency of reproducing the first response voice Vy1 (e.g., the threshold value that is compared with the random number) may, for example, be changed in accordance with an instruction made by the user U.

Fourth Embodiment

Figure 15:
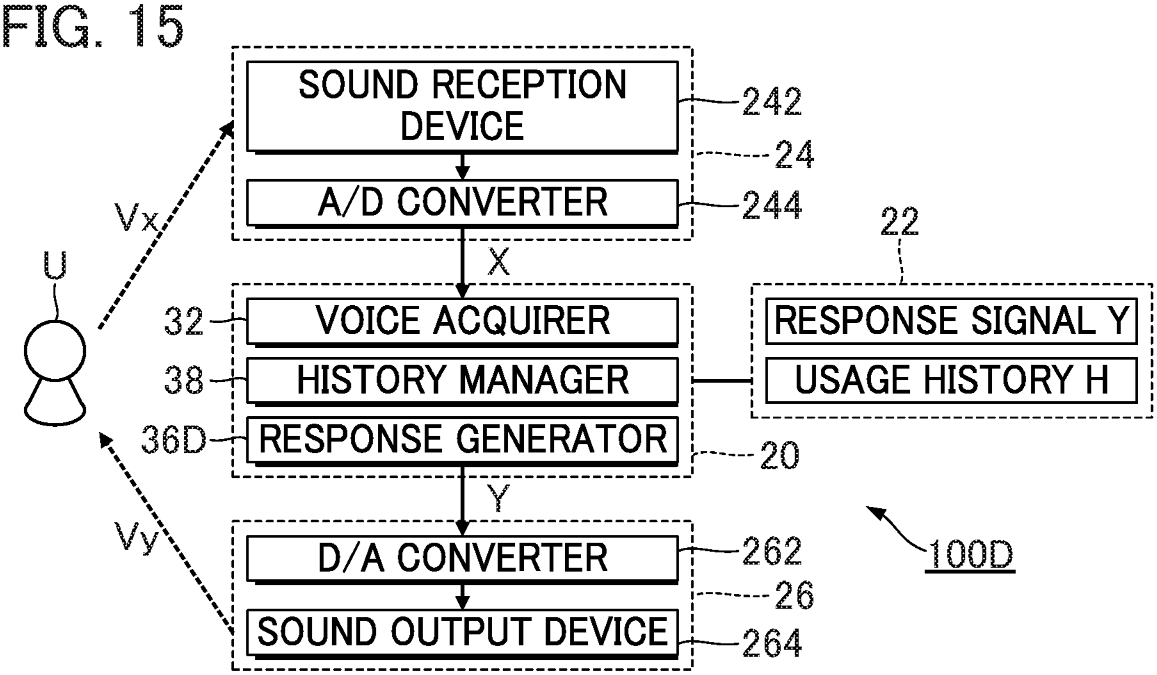
FIG. 15 is a diagram showing a configuration of a voice interaction apparatus in a fourth embodiment.

FIG. 15 is a diagram showing a configuration of a voice interaction apparatus 100D according to a fourth embodiment of the present invention. Similarly to the voice interaction apparatus 100A of the first embodiment, the voice interaction apparatus 100D of the fourth embodiment reproduces a response voice Vy directed toward a speech sound Vx uttered by the user U.

As shown in the example in FIG. 15, the voice interaction apparatus 100D of the fourth embodiment is configured in a manner such that the voice analyzer 34A and the response generator 36A in the voice interaction apparatus 100A of the first embodiment are replaced by a history manager 38 and a response generator 36D. Configurations and operations of other elements (the voice input device 24, the reproduction device 26, and the voice acquirer 32) in the voice interaction apparatus 100D are similar to those in the first embodiment. The storage device 22 of the fourth embodiment stores a response signal Y indicative of a response voice Vy with a specific speech content. In the following description, a response voice Vy of “un” representative of a backchannel directed toward a speech sound Vx is provided as an example.

The history manager 38 in FIG. 15 generates a history (hereinafter referred to as “usage history”) H of a voice interaction by the voice interaction apparatus 100D. The usage history H of the fourth embodiment is a number of times (hereinafter referred to as “usage frequency”) N a voice interaction is executed in the past using the voice interaction apparatus 100D. More specifically, the history manager 38 counts a number of times of the voice interaction as a usage frequency N, treating a sequence from a beginning of the voice interaction (activation of the voice interaction apparatus 100D) to an end of the voice interaction as one use (i.e., one time of a voice interaction that includes multiple pairs of utterances of a speech sound Vx and reproduction of a response voice Vy). The usage history H generated by the history manager 38 is stored in the storage device 22.

The response generator 36D of the fourth embodiment causes the reproduction device 26 to reproduce a response voice Vy that has a prosody corresponding to the usage history H generated by the history manager 38. In other words, the prosody of the response voice Vy is controlled to be variable in accordance with the usage history H. In the fourth embodiment, a waiting period W for reproduction of the response voice Vy is treated as the prosody of the response voice Vy, and is controlled in accordance with the usage history H. The waiting period W is a time length from the end point tB of the speech sound Vx to the response start point ty of the response voice Vy (i.e., an interval between the speech sound Vx and the response voice Vy).

In real-life interaction between humans, there is observed a tendency for a prosody of a speech sound to change with time as interaction with a particular interacting partner is repeated. More specifically, at a stage immediately after two strangers commence interaction with each other (a stage at which each person is not used to interacting with the interacting partner), since each person is unable to anticipate a suitable speech timing particular to the interacting partner, a time length between speech by a speaker and a response to the speech tends to be long (i.e., the interaction is awkward); while such a time length tends to become short (i.e., an interaction proceeds smoothly) as interaction with the interacting partner is repeated. Taking into account this tendency, the response generator 36D of the fourth embodiment controls the waiting period W in accordance with the usage history H such that the waiting period W for the response voice Vy is shorter in a case where the usage frequency N indicated by the usage history H is high as compared to a case where the usage frequency N is low.

Figure 16:
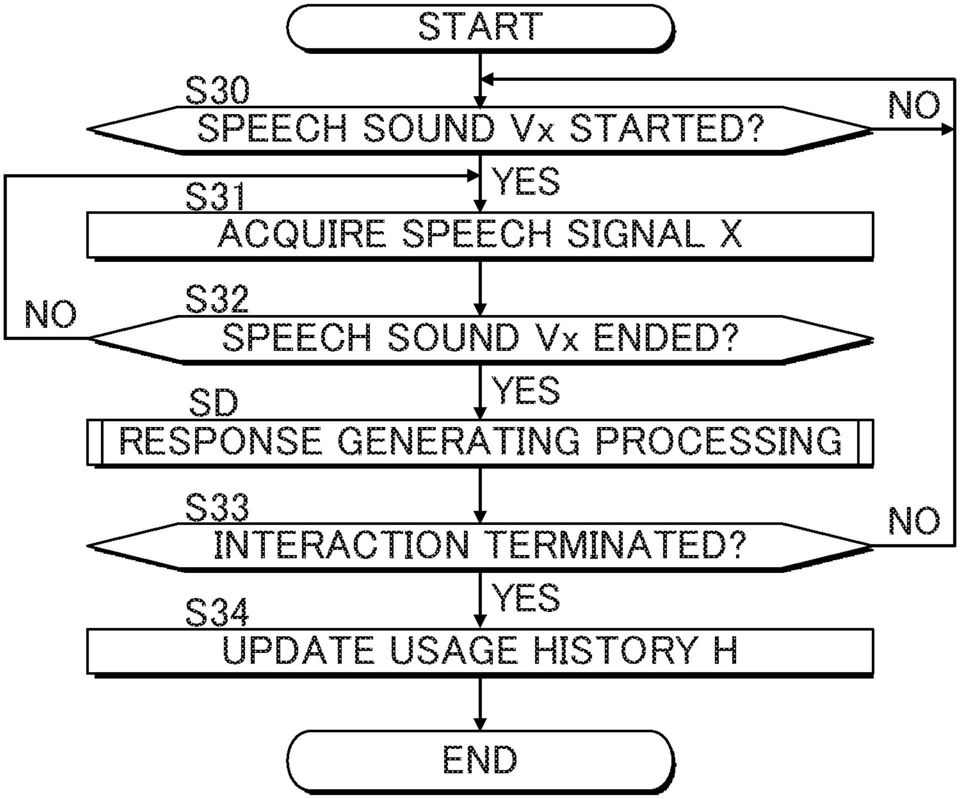
FIG. 16 is a flowchart showing operations carried out by the voice interaction apparatus in the fourth embodiment.

FIG. 16 is a flowchart showing processing executed by the control device 20 of the fourth embodiment. For example, with an instruction (instruction to activate a program for a voice interaction) from the user U issued to the voice interaction apparatus 100D serving as a trigger, the processing of FIG. 16 is initiated. When a voice interaction is first started by the voice interaction apparatus 100D, the usage history H is set to an initial value (e.g., N=0).

Similarly to the first embodiment, after a speech sound Vx has started (S30:YES), the voice acquirer 32 acquires a speech signal X from the voice input device 24 and stores the speech signal X in the storage device 22 (S31). Acquisition of a speech signal X by the voice acquirer 32 is repeated until the end of the speech sound Vx (S32:NO).

After the speech sound Vx has ended (S32:YES), the response generator 36D executes response generating processing SD for causing the reproduction device 26 to reproduce a response voice Vy with a prosody that corresponds to the usage history H, which is stored in the storage device 22. As described above, in the response generating processing SD in the fourth embodiment, the waiting period W is controlled in accordance with the usage history H, the waiting period W being from the end point tB of the speech sound Vx to the response start point ty at which reproduction of the response voice Vy is started. Acquisition of the speech signal X by the voice acquirer 32 (S31) and the response generating processing SD by the response generator 36D are repeated until termination of the voice interaction is instructed by the user U (S33:NO). Accordingly, similarly to the first embodiment, voice interaction is realized in which utterance of a freely-chosen speech sound Vx by the user U and reproduction of a response voice Vy directed toward the speech sound Vx are alternately repeated.

After termination of the voice interaction is instructed by the user U (S33:YES), the history manager 38 updates the usage history H stored in the storage device 22 to a content that takes the just ended voice interaction into account (S34). More specifically, the history manager 38 increases the usage frequency N indicated by the usage history H by one.

In this way, the usage history H is increased by one for every execution of a voice interaction by the voice interaction apparatus 100D. The processing of FIG. 16 ends after the usage history H is updated.

Figure 17:
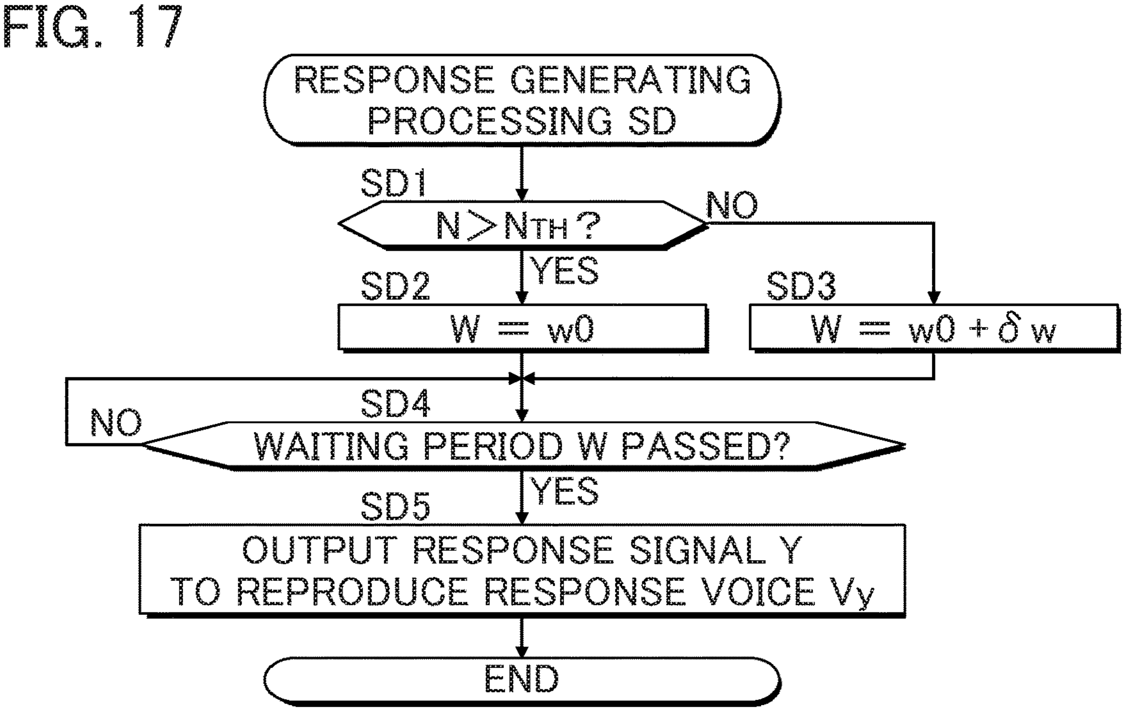
FIG. 17 is a flowchart showing response generating processing in the fourth embodiment.
Figure 18:
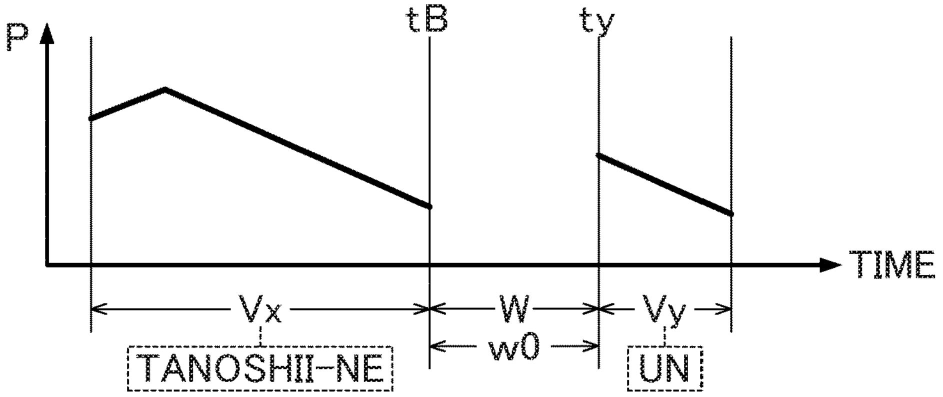
FIG. 18 is an explanatory diagram of a speech sound and a response voice in the fourth embodiment.
Figure 19:
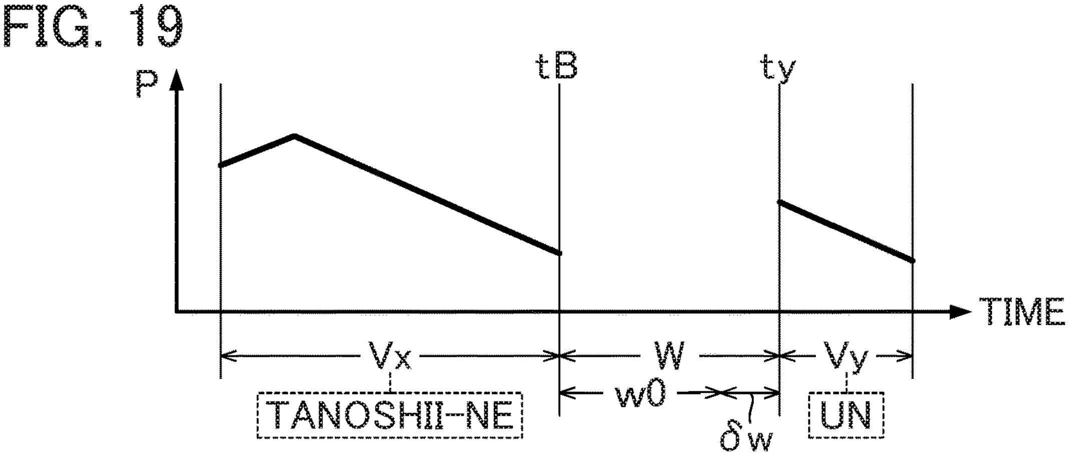
FIG. 19 is an explanatory diagram of a speech sound and a response voice in the fourth embodiment.

FIG. 17 is a flowchart of the response generating processing SD of the fourth embodiment, and FIG. 18 and FIG. 19 are explanatory diagrams for the response generating processing SD. After initiating the response generating processing SD, the response generator 36D sets the waiting period W to be variable in accordance with the usage history H stored in the storage device 22 (SD1 to SD3). More specifically, the response generator 36D first determines whether the usage frequency N indicated by the usage history H is higher than a predetermined threshold value $N_{TH}$ (SD1). In a case where the usage frequency N is higher than the threshold value $N_{TH}$ (SD1:YES), as shown in the example of FIG. 18, the response generator 36D sets a predetermined baseline value w0 (e.g., 150 ms) as the waiting period W (SD2). In a case where the usage frequency N is lower than the threshold value $N_{TH}$ (SD1:NO), as shown in the example of FIG. 19, the response generator 36D sets a value (w0+δw) derived by adding a predetermined adjustment value (offset) δw to the baseline value w0 as the waiting period W (SD3). The adjustment value δw is set to be a predetermined positive value. In the above description, the waiting period W is controlled in a binary manner in accordance with whether the usage frequency N is higher than the threshold value $N_{TH}$. Alternatively, the waiting period W may be changed in multivalue manner in accordance with the usage frequency N.

The response generator 36D waits until the waiting period W, which has been set in accordance with the usage history H in the above processing, has passed since the end point tB of the speech sound Vx (SD4:NO). Upon arrival of the response start point ty by passage of the waiting period W (SD4:YES), the response generator 36D provides the response signal Y stored in the storage device 22 to the reproduction device 26, thereby causing the response voice Vy to be reproduced (SD5). As will be understood from the above description, the response generator 36D of the fourth embodiment causes the reproduction device 26 to reproduce the response voice Vy that has a prosody (the waiting period W in the fourth embodiment) corresponding to the usage history H of the voice interaction apparatus 100D. More specifically, in a case where the usage frequency N indicated by the usage history H is high, the response voice Vy is reproduced after passage of the waiting period W having the baseline value w0; and in a case where the usage frequency N is low, the response voice Vy is reproduced after passage of the waiting period W having a value derived by adding the adjustment value δw to the baseline value w0. In other words, in a case where the usage frequency N is high, the waiting period W is set to be short.

As described above, in the fourth embodiment, there is reproduced the response voice Vy with a prosody (waiting period W) corresponding to the usage history H of a voice interaction by the voice interaction apparatus 100D. Accordingly, it is possible to realize natural voice interaction that is imitative of real-life interaction where a prosody of a speech sound tends to change with time as an interaction with a particular partner is repeated. In the fourth embodiment in particular, the waiting period W, which is an interval between a speech sound Vx and a response voice Vy, is controlled in accordance with the usage history H. In this way, natural voice interaction is realized that is imitative of real-life interaction where an interval between speech and a response tends to be protracted immediately after a person first interacts with a stranger, and the interval becomes shorter as interaction with the interacting partner is repeated.

Modifications

The voice interaction apparatuses 100 (100A, 100B, 100C, and 100D) shown as examples in the above-described embodiments can be modified in a various manner. Specific modes of modification are described below as examples. Two or more modes freely selected from the following examples can be combined, as appropriate, so long as they do not contradict each other.

(1) It is possible to combine two or more configurations freely selected from the first to the fourth embodiments. More specifically, the configuration of the first embodiment, in which a prosody of a response voice Vy is controlled in accordance with a prosody (e.g., pitches P) of a speech sound Vx, may be similarly applied to the second to the fourth embodiments. For example, in the second embodiment, a prosody of a response signal Y that is selected at step SB3 or step SB4 in FIG. 9 may be controlled in accordance with a prosody (e.g., pitches P) of the speech sound Vx, and then may be caused to be reproduced by the reproduction device 26. Similarly, in the third embodiment, a prosody of a response signal Y that is selected at step SC2 or step SC3 in FIG. 12 may be controlled in accordance with a prosody of the speech sound Vx; and in the fourth embodiment, a prosody of a response signal Y that is acquired from the storage device 22 at step SD5 in FIG. 17 may be controlled in accordance with a prosody of the speech sound Vx. In configurations in which the first embodiment is applied to the second to the fourth embodiments, similarly to the first embodiment, pitches of a response signal Y are adjusted such that, for example, a pitch at the start point (an initial pitch) of a particular mora (typically, the final mora) of the response voice Vy corresponds to the minimum pitch $P_{min}$ within the tailing section E of the speech sound Vx.

The configuration of the third embodiment, in which either the first response voice Vy1 representative of an inquiry directed toward a speech sound Vx or the second response voice Vy2 representative of a response other than an inquiry is selectively reproduced, may be applied to each embodiment other than the third embodiment. Additionally or alternatively, the configuration of the fourth embodiment, in which the prosody (e.g., waiting period W) of the response voice Vy is controlled in accordance with the usage history H of a voice interaction, may be applied to the first to the third embodiments.

(2) Various variables related to voice interaction in each of the above embodiments may be modified in accordance with an instruction made by the user U, for example. For example, a reproduction volume of a response voice Vy may be controlled in accordance with an instruction made by the user U, or a type of a response voice Vy to be actually reproduced by the reproduction device 26 may be selected in accordance with an instruction made by the user U from among multiple types of response voices Vy that are different in sex of a speaker or voice qualities (a gentle voice or a harsh voice). Furthermore, in the first to third embodiments, a time length of the waiting period W from the end point tB of a speech sound Vx to the response start point ty of a response voice Vy may be set in accordance with an instruction made by the user U.

(3) In the modification of the third embodiment, a configuration is shown in which the frequency of reproducing a first response voice Vy1 representative of an inquiry directed toward a speech sound Vx may be changed in accordance with an instruction made by the user U. Alternatively, a frequency of reproducing the first response voice Vy1 may be controlled in accordance with factors other than an instruction made by the user U. More specifically, the response generator 36D of the third embodiment may control the frequency of reproducing the first response voice Vy1 in accordance with the usage history H in the fourth embodiment. For example, in real-life interaction between humans, there can be assumed a tendency that as a person repeats interaction with a particular interacting partner, he/she is better able to understand speech characteristics (e.g., a favored phrase or a tone of voice) of the interacting partner, and as a result, a frequency of an inquiry being made in response to a speech sound decreases. Taking into account this tendency, it is preferable that as the usage frequency N indicated by the usage history H increases, a frequency of reproducing the first response voice Vy1 decreases.

(4) In the fourth embodiment, the usage frequency N of a voice interaction is described as an example of a usage history H, but the usage history H is not limited to the usage frequency N. For example, any of the following examples may be used as the usage history H for controlling the waiting period W: the number of times of reproducing a response voice Vy within a voice interaction; a usage frequency of a voice interaction (usage frequency for each unit period); a use period of a voice interaction (e.g., time elapsed since the first use of the voice interaction apparatus 100); or time elapsed since the last use of the voice interaction apparatus 100.

(5) In the first embodiment, a response signal Y is generated from a sound signal Z pre-stored in the storage device 22 and is reproduced; and in the second to fourth embodiments, a response signal Y pre-stored in the storage device 22 is reproduced. However, a response signal Y indicative of a response voice Vy of a particular speech content may be synthesized by a publicly known voice synthesis technique. For example, segment-connecting-type voice synthesis or voice synthesis using a statistical model, such as a hidden Markov model, is preferably used for the synthesis of a response signal Y. Furthermore, a speech sound Vx and a response voice Vy are not limited to a voice uttered by a human. For example, the cry of an animal may be used for a speech sound Vx and a response voice Vy.

(6) In the modes described above, exemplary configurations are shown in which a voice interaction apparatus 100 includes the voice input device 24 and the reproduction device 26. However, the voice input device 24 and the reproduction device 26 may be provided in a device (voice input-output device) separate from the voice interaction apparatus 100. The voice interaction apparatus 100 is realized by a terminal device, such as a mobile phone or a smartphone, and the voice input-output device is realized by an electronical device, such as an animal-shaped toy or robot. The voice interaction apparatus 100 and the voice input-output device can communicate with each other wirelessly or by wire. Speech signals X generated by the voice input device 24 in the voice input-output device are transmitted to the voice interaction apparatus 100 wirelessly or by wire, and response signals Y generated by the voice interaction apparatus 100 are transmitted to the reproduction device 26 in the voice input-output device.

(7) In the above-described modes, a voice interaction apparatus 100 is realized by an information processing device, such as a mobile phone or a personal computer. Alternatively, part or all of the functions of the voice interaction apparatus 100 may be realized by a server device (so-called cloud server). More specifically, the voice interaction apparatus 100 is realized by a server device that communicates with a terminal device via a communication network, such as a mobile communication network or the Internet. For example, the voice interaction apparatus 100 receives from the terminal device a speech signal X generated by the voice input device 24 in the terminal device, and generates a response signal Y from the speech signal X with any of the configurations described in the above-described modes. The voice interaction apparatus 100 then transmits the response signal Y generated from the speech signal X to the terminal device, and causes the reproduction device 26 in the terminal device to reproduce a response voice Vy. The voice interaction apparatus 100 is realized by a single device or by a group of devices (i.e., a server system). Part of the functions of the voice interaction apparatus 100 in any of the above-described modes (e.g., at least one among the voice acquirer 32, the voice analyzers 34A and 34C, the response generators 36A, 36B, 36C, and 36D, and the history manager 38) may be realized by the server device, and other functions may be realized by the terminal device. It can be freely selected which of the server device and the terminal device realizes each function realized by the voice interaction apparatus 100 (division of the functions is freely determined).

(8) In the above-described modes, a response voice Vy representing a particular speech content (e.g., a backchannel such as "un") is reproduced in response to a speech sound Vx. However, the speech content of a response voice Vy is not limited to the above example. For example, it is possible to analyze a speech content of a speech sound Vx by voice recognition and morpheme analysis on the speech signal X, to select from multiple candidates a response voice Vy with a content appropriate to the speech content, and to cause the reproduction device 26 to reproduce the selected response voice Vy. In a configuration in which voice recognition and morpheme analysis are not executed (e.g., examples configurations in the first embodiment to the fourth embodiment), a response voice Vy with a speech content that is prepared in advance independently of a speech sound Vx is reproduced. Superficially regarded, it may be guessed that natural interaction will not be established in such a case. However, as a result of control of a prosody of a response voice Vy to vary as described in the examples of the above modes, in a practical sense, it is possible for the user U to receive a feeling of having natural interaction with a human. In configurations in which voice recognition and morpheme analysis are not executed, there is an advantage that processing delay and processing load due to these processes are reduced or resolved.

Alternatively, it is possible to selectively use one of sound signals Z with different speech contents for reproduction of a response voice Vy. For example, the response generator 36A of the first embodiment selects one of sound signals Z with different speech contents from the storage device 22 and provides a response signal Y corresponding to the selected sound signal Z to the reproduction device 26, thereby causing a response voice Vy to be reproduced. A manner to select a sound signal Z is freely chosen; for example, a manner to randomly select one of sound signals Z may be assumed. In a configuration in which a sound signal Z is randomly selected, the voice analyzer 34 (34A, 34C, or 34D) may be omitted. Accordingly, there is an advantage that a processing load on the control device 20 is reduced. Alternatively, a sound signal Z selected from the storage device 22 may be provided to the reproduction device 26 as a response signal Y as it is, or a response signal Y generated by adjusting a prosody (e.g., pitches or volume) of the sound signal Z may be provided to the reproduction device 26. For example, a configuration in which a prosody (typically pitches) of the sound signal Z is adjusted in accordance with the minimum pitch $P_{min}$ of a speech sound Vx as shown in the example of the first embodiment, or a configuration in which a prosody of the sound signal Z is randomly adjusted is preferred.

(9) It is possible to use the voice interaction apparatus 100 (100A, 100B, 100C, or 100D) described in any of the above modes for evaluating actual interaction between humans. For example, a prosody of a response voice (hereinafter referred to as "observed voice") that is observed in actual interaction between humans may be compared with a prosody of a response voice Vy generated in the above modes. In a case where the compared prosodies are similar, the observed voice may be evaluated as appropriate; and in a case where the prosodies deviate from each other, the observed voice may be evaluated as inappropriate. An apparatus (interaction evaluating apparatus) that executes evaluation as described above as an example can be used in a training for interactions between humans.

(10) In each of the above mode, a section with a predetermined time period ending on the end point tB of a speech sound Vx within the speech sound Vx is described as an example of the tailing section E, but conditions for the tailing section E are not limited to the above example. For example, a section that occupies a predetermined fraction of a speech sound Vx and includes the end point tB of the speech sound Vx may be defined as the tailing section E. Alternatively, the tailing section E may be defined to have its end point at a time point proximate to the end point tB within the speech sound Vx (at a time point earlier than the end point tB). That is, the tailing section E may be defined as a section excluding a section proximate to the end point tB within the speech sound Vx. As will be understood from the above examples, the tailing section E is expressed comprehensively as a section proximate to the end point tB within the speech sound Vx.

(11) The voice interaction apparatus 100 (100A, 100B, 100C, or 100D) described as an example in each of the above modes can be realized by the control device 20 and the program for a voice interaction coordinating with each other, as mentioned above.

A program according to a first mode of the present invention causes a computer to execute: voice acquiring processing of acquiring a speech signal indicative of a speech sound; voice analyzing processing of identifying a series of pitches of the speech sound from the speech signal; and response generating processing of causing a reproduction device to reproduce a response voice of pitches controlled in accordance with the lowest pitch of the pitches identified in the voice analyzing processing during a tailing section proximate to an end point within the speech sound.

A program according to a second mode of the present invention causes a computer to execute: voice acquiring processing of acquiring a speech signal indicative of a speech sound; voice analyzing processing of identifying a series of pitches of the speech sound from the speech signal; and response generating processing of causing a reproduction device to reproduce a response voice that has a prosody corresponding to transition of the pitches identified in the voice analyzing processing during a tailing section proximate to an end point within the speech sound.

A program according to a third mode of the present invention causes a computer to execute: voice acquiring processing of acquiring a speech signal indicative of a speech sound; and response generating processing of causing a reproduction device to selectively reproduce either a first response voice or a second response voice, wherein the first response voice represents an inquiry directed toward the speech sound and the second response voice represents a response other than an inquiry.

A program according to a fourth mode of the present invention is for a voice interaction in which a response voice directed toward a speech sound is reproduced, the program causing a computer to execute: voice acquiring processing of acquiring a speech signal indicative of the speech sound; history managing processing of generating a usage history of the voice interaction; and response generating processing of causing a reproduction device to reproduce the response voice that has a prosody corresponding to the usage history.

A program according to each of the above modes may be provided in a format stored in a computer-readable recording medium and be installed in a computer. The recording medium is for example a non-transitory recording medium; a good example of which is an optical recording medium (optical disk), such as a CD-ROM. However, the recording medium can encompass any of publicly known formats, such as a semiconductor recording medium or a magnetic recording medium. The "non-transitory recording medium" here includes all computer-readable recording medium except for a transitory, propagating signal, and a volatile recording medium is not excluded. The program can be delivered to the computer by distribution via a communication network.

(11) Preferred modes of the present invention as understood from the specific exemplary modes described above are described in the following.

Mode 1

A voice interaction method according to a preferred mode (mode 1) of the present invention includes: acquiring a speech signal indicative of a speech sound; identifying a series of pitches (e.g., a time series of values representative of temporal variations of the pitches) of the speech sound from the speech signal; and causing a reproduction device to reproduce a response voice of pitches controlled in accordance with the lowest pitch (e.g., a lowest value among values representing temporal variations of the pitches within the tailing section) of the pitches identified, in the identifying of the series of pitches of the speech sound, during a tailing section proximate to an end point within the speech sound. In this mode, there is reproduced by the reproduction device a response voice of pitches controlled in accordance with the lowest pitch within the tailing section proximate to the end point of the speech sound. Accordingly, it is possible to realize natural voice interaction that is imitative of real-life interaction where an interacting partner tends to utter a response voice of pitches that correspond to a pitch that occurs proximate to the end point of the speech sound.

Mode 2

In a preferred example (mode 2) of mode 1, in the causing of the reproduction device to reproduce the response voice, the reproduction device is caused to reproduce the response voice such that an initial pitch of the final mora of the response voice corresponds to the lowest pitch of the tailing section within the speech sound. In this mode, since the response voice is reproduced such that the initial pitch of the final mora of the response voice corresponds to the lowest pitch of the tailing section of the speech sound, an advantageous effect is obtained in that a particularly natural voice interaction close to real-life interaction can be realized.

Mode 3

In a preferred example (mode 3) of mode 1 or mode 2, in the causing of the reproduction device to reproduce the response voice, the pitches of the response voice vary with each speech sound. In this mode, since the pitches of the response voice vary for each utterance of a speech sound, compared to a configuration in which there is no variation in pitches of a response voice responding to speech sounds, an advantage is obtained in that natural voice interaction close to real-life interaction can be realized.

Mode 4

A voice interaction apparatus according to a preferred mode (mode 4) of the present invention includes: a voice acquirer configured to acquire a speech signal indicative of a speech sound; a voice analyzer configured to identify a series of pitches of the speech sound from the speech signal; and a response generator configured to cause a reproduction device to reproduce a response voice of pitches controlled in accordance with the lowest pitch of the pitches identified by the voice analyzer during a tailing section proximate to an end point within the speech sound. In this mode, the response voice is reproduced by the reproduction device with pitches controlled in accordance with the lowest pitch within the tailing section proximate to the end point of the speech sound. Accordingly, it is possible to realize natural voice interaction that is imitative of real-life interaction where an interacting partner tends to utter a response voice of pitches that correspond to a pitch that occurs proximate to an end point of a speech sound.

Mode 5

A voice interaction method according to a preferred mode (mode 5) of the present invention includes: acquiring a speech signal indicative of a speech sound; identifying a series of pitches (e.g., a time series of values representing temporal variations of the pitches) of the speech sound from the speech signal; and causing a reproduction device to reproduce a response voice that has a prosody corresponding to transition of the pitches identified, in the identifying of a pitch of the speech sound, during a tailing section proximate to an end point within the speech sound. In this mode, there is reproduced by the reproduction device a response voice with a prosody that corresponds to transition of the pitches in the tailing section of the speech sound. Accordingly, it is possible to realize natural voice interaction that is imitative of real-life interaction where an interacting partner tends to utter a response voice with a prosody that is in accordance with a content of speech of a speaker.

Mode 6

In a preferred example (mode 6) of mode 5, in the causing of the reproduction device to reproduce the response voice, the reproduction device is caused to reproduce the response voice that has a different prosody between a case where the identified pitches decrease and then increase within the tailing section and a case where the identified pitches decrease from a start point to an end point of the tailing section. In this mode, since the prosody of the response voice differs between a case where the pitches decrease and then increase within the tailing section and a case where the pitches decrease from the start point to the end point of the tailing section, it is possible to realize natural voice interaction imitative of real-life interaction where a prosody of a response voice tends to differ between a question and a declarative sentence.

Mode 7

In a preferred example (mode 7) of mode 5, the causing of the reproduction device to reproduce the response voice includes: comparing a first average pitch with a second average pitch, wherein the first average pitch is an average pitch in a first section within the tailing section (e.g., an average of values representing temporal variations of pitches within the first section) and the second average pitch is an average pitch in a second section within the tailing section (e.g., an average of values representing temporal variations of pitches within the second section), the second section coming after the first section; and causing the reproduction device to reproduce the response voice that has a different prosody between a case where the first average pitch is lower than the second average pitch and a case where the first average pitch is higher than the second average pitch. In this mode, the prosody of the response voice differs depending on a result of the comparison between the first average pitch in the first section situated in a front portion of the tailing section and the second average pitch in the second section situated in a rear portion of the tailing section. Accordingly, an advantage is obtained in that transition of pitches can be evaluated by simple processing involving averaging and comparing pitches.

Mode 8

In a preferred example (mode 8) of any of mode 5 to mode 7, the causing of the reproduction device to reproduce the response voice includes: acquiring a response signal indicative of a response voice that is in accordance with the transition of the identified pitches in the tailing section from a storage device that stores a plurality of response signals indicative of response voices with different prosodies; and causing the reproduction device to reproduce the response voice by outputting the acquired response signal. In this mode, the response voice is reproduced by selective use of response signals stored in the storage device. Accordingly, compared with a configuration in which a prosody of a response signal is adjusted in accordance with transition of pitches within the tailing section, an advantage is obtained in that a processing load on the response generator can be reduced.

Mode 9

In a preferred example (mode 9) of any of mode 5 to mode 7, the causing of the reproduction device to reproduce the response voice includes: generating, from a response signal indicative of a response voice with a predetermined prosody, a response signal indicative of a response voice with a prosody that corresponds to the transition of the pitches in the tailing section; and causing the reproduction device to reproduce the response voice indicated by the generated response signal by outputting the generated response signal. In this mode, a response signal with a prosody that corresponds to the transition of the pitches within the tailing section of a speech sound is generated from an initial response signal. Accordingly, an advantage is obtained in that there is no need to retain response signals with different prosodies in the storage device.

Mode 10

A voice interaction apparatus according to a preferred mode (mode 10) of the present invention includes: a voice acquirer configured to acquire a speech signal indicative of a speech sound; a voice analyzer configured to identify a series of pitches of the speech sound from the speech signal; and a response generator configured to cause a reproduction device to reproduce a response voice that has a prosody corresponding to transition of the pitches identified by the voice analyzer during a tailing section proximate to an end point within the speech sound. In this mode, there is reproduced by the reproduction device a response voice with a prosody that corresponds to transition of pitches in the tailing section of a speech sound. Accordingly, it is possible to realize natural voice interaction that is imitative of real-life interaction where an interacting partner tends to utter a response voice with a prosody that is in accordance with a content of speech of a speaker.

Mode 11

A voice interaction method according to a preferred mode (mode 11) of the present invention includes: acquiring a speech signal indicative of a speech sound; and causing a reproduction device to selectively reproduce either a first response voice or a second response voice, wherein the first response voice represents an inquiry directed toward the speech sound and the second response voice represents a response other than an inquiry. In this mode, the first response voice representing an inquiry directed toward a speech sound and the second response voice representing a response other than an inquiry are selectively reproduced by the reproduction device. Accordingly, it is possible to realize natural voice interaction that is imitative of real-life interaction where there tends to arise on occasion an inquiry (a request to repeat a speech) directed toward a speaker, as well as a backchannel to the speech of the speaker.

Mode 12

A preferred example (mode 12) of mode 11 further includes identifying from the speech signal a prosody index value indicative of a prosody of the speech sound, wherein the causing of the reproduction device to reproduce the response voice includes: comparing the prosody index value of the speech sound with a threshold value; and selecting either the first response voice or the second response voice in accordance with a result of the comparison. In this mode, in accordance with a result of the comparison between the prosody index value representing the prosody of the speech sound and the threshold value, one of the first response voice and the second response voice is selected. Accordingly, it is possible to realize natural voice interaction that is imitative of real-life interaction where there is a tendency that, when a prosody of a speech sound varies, it becomes difficult to catch the speech sound and it becomes likely that an inquiry is made.

Mode 13

In a preferred example (mode 13) of mode 11 or mode 12, in the identifying of the prosody index value, the threshold value is set to a representative value of prosody index values of past speech sounds. In this mode, since a representative value of prosody index values of the past speech sounds is set as the threshold value, it is possible to realize natural voice interaction that is imitative of real-life interaction where there is a tendency that, when a prosody of a speech sound of a speaker deviates from a standard prosody of the speaker (i.e., a prosody anticipated by an interacting partner), it is more likely that the interacting partner will make an inquiry.

Mode 14

In a preferred mode (mode 14) of mode 11 to mode 13, in the causing of the reproduction device to reproduce the response voice, the first response voice is selected in a case where the prosody index value is a value outside a predetermined range that includes the threshold value, and the second response voice is selected in a case where the prosody index value is a value within the predetermined range. In this mode, in a case where the prosody index value is outside the predetermined range, the first response voice is selected, and in a case where the prosody index value is within the predetermined range, the second response voice is selected. Accordingly, it is possible to reduce a possibility of reproducing the first response voice at an excessively high frequency.

Mode 15

In a preferred example (mode 15) of mode 11, in the causing of the reproduction device to reproduce the response voice, the reproduction device is caused to reproduce the first response voice as a response to a speech sound that is selected randomly from among a plurality of speech sounds. In this mode, since the first response voice is reproduced as a response to a speech sound randomly selected from among speech sounds, it is possible to realize natural voice interaction that is imitative of real-life voice interaction where an inquiry directed toward a speech sound tends to occur randomly.

Mode 16

In a preferred example (mode 16) of mode 15, the causing of the reproduction device to reproduce the response voice includes setting a frequency for reproducing the first response voice as a response to the plurality of speech sounds.

Mode 17

In a preferred example (mode 17) of mode 16, in the causing of the reproduction device to reproduce the response voice, the frequency for reproducing the first response voice is set in accordance with a usage history of a voice interaction.

Mode 18

A voice interaction apparatus according to a preferred mode (mode 18) of the present invention includes: a voice acquirer configured to acquire a speech signal indicative of a speech sound; and a response generator configured to cause a reproduction device to selectively reproduce either a first response voice or a second response voice, wherein the first response voice represents an inquiry directed toward the speech sound and the second response voice represents a response other than an inquiry. In this mode, one of the first response voice representing an inquiry directed toward the speech sound and the second response voice representing a response other than an inquiry is selectively reproduced by the reproduction device. Accordingly, it is possible to realize natural voice interaction that is imitative of real-life interaction where there tends to arise on occasion an inquiry (a request to repeat speech) directed to a speaker, as well as a backchannel to the speech of the speaker.

Mode 19

A voice interaction method according to a preferred mode (mode 19) of the present invention is a method for executing a voice interaction in which a response voice directed toward a speech sound is reproduced. The voice interaction method includes: acquiring a speech signal indicative of the speech sound; generating a usage history of the voice interaction; and causing a reproduction device to reproduce the response voice that has a prosody corresponding to the usage history. In this mode, since a response voice with a prosody that corresponds to a usage history of a voice interaction is reproduced, it is possible to realize natural voice interaction that is imitative of real-life interaction where a prosody of a speech sound tends to vary with time as an interaction with a particular interacting partner is repeated.

Mode 20

In a preferred example (mode 20) of mode 19, the causing of the reproduction device to reproduce the response voice includes controlling a waiting period in accordance with the usage history, wherein the waiting period is an interval between the speech sound and the response voice. In this mode, since the waiting period, which is an interval between a speech sound and a response voice, is controlled in accordance with the usage history, natural voice interaction is realized that is imitative of real-life interaction where an interval between a speech and a response tends to be protracted immediately after a speaker first interacts with an interacting partner, and an interval between speech and a response becomes shorter as an interaction with the interacting partner is repeated.

Mode 21

A voice interaction apparatus according to a preferred mode (mode 21) of the present invention is an apparatus that executes a voice interaction in which a response voice directed toward a speech sound is reproduced. The voice interaction apparatus includes: a voice acquirer configured to acquire a speech signal indicative of the speech sound; a history manager configured to generate a usage history of the voice interaction; and a response generator configured to cause a reproduction device to reproduce the response voice that has a prosody corresponding to the usage history. In this mode, since a response voice with a prosody that corresponds to a usage history of a voice interaction is reproduced, it is possible to realize natural voice interaction that is imitative of real-life interaction where a prosody of a speech sound tends to vary with time as an interaction with a particular interacting partner is repeated.

DESCRIPTION OF REFERENCE SIGNS

100 (100A, 100B, 100C, and 100D) . . . voice interaction apparatus, 20 . . . control device, 22 . . . storage device, 24 . . . voice input device, 242 . . . sound reception device, 244 . . . A/D converter, 26 . . . reproduction device, 262 . . . D/A converter, 264 . . . sound output device, 32 . . . voice acquirer, 34A and 34C . . . voice analyzer, 36A, 36B, 36C, and 36D . . . response generator, 38 . . . history manager.

What is claimed is:

1. A voice interaction method comprising:

acquiring a speech signal indicative of a speech sound that is directed toward an interacting partner;

identifying a series of pitches of the speech sound from the speech signal;

identifying a lowest pitch among the series of pitches, wherein the series of pitches are pitches of a tailing section proximate to an end point within the speech sound; and causing a reproduction device to reproduce a response voice of pitches controlled in accordance with the lowest pitch.

2. The voice interaction method according to claim 1, wherein in the causing of the reproduction device to reproduce the response voice, an initial pitch of a final mora of the response voice is controlled in accordance with the lowest pitch of the tailing section within the speech sound.

3. The voice interaction method according to claim 1, wherein a plurality of speech signals are acquired and for each of the plurality of acquired speech signals, the identifying of a series of pitches of a speech sound indicated by the speech signal and the causing of the reproduction device to reproduce a response voice are executed, and wherein pitches of response voices corresponding to the plurality of speech signals are controlled differently for each of the plurality of speech signals.

4. The voice interaction method according to claim 1, wherein the response voice has a prosody corresponding to transition of the pitches identified during the tailing section.

5. The voice interaction method according to claim 4, wherein the response voice has a different prosody between a case where the identified pitches decrease and then increase within the tailing section and a case where the identified pitches decrease from a start point to an end point of the tailing section.

6. The voice interaction method according to claim 4, wherein the causing of the reproduction device to reproduce the response voice includes comparing a first average pitch with a second average pitch, wherein the first average pitch is an average pitch in a first section within the tailing section and the second average pitch is an average pitch in a second section within the tailing section, the second section coming after the first section, and wherein the response voice has a different prosody between a case where the first average pitch is lower than the second average pitch and a case where the first average pitch is higher than the second average pitch.

7. The voice interaction method according to claim 4, wherein the causing of the reproduction device to reproduce the response voice includes:

acquiring a response signal indicative of the response voice from a storage device that stores a plurality of response signals indicative of response voices with different prosodies; and outputting the acquired response signal to cause the reproduction device to reproduce the response voice.

8. The voice interaction method according to claim 4, wherein the causing of the reproduction device to reproduce the response voice includes:

generating, from a response signal indicative of a response voice with a predetermined prosody, a response signal indicative of the response voice; and outputting the generated response signal to cause the reproduction device to reproduce the response voice.

9. The voice interaction method according to claim 4, wherein the prosody includes an identified prosody index value that is calculated for each speech sound.

10. The voice interaction method according to claim 1, wherein in the causing of the reproduction device to reproduce the response voice, the response voice is selected from among a first response voice and a second response voice, wherein the first response voice represents an inquiry directed toward the speech sound and the second response voice represents a response other than an inquiry.

11. The voice interaction method according to claim 10, further comprising identifying from the speech signal a prosody index value indicative of a prosody of the speech sound, wherein the causing of the reproduction device to reproduce the response voice includes:

comparing the prosody index value of the speech sound with a threshold value; and selecting either the first response voice or the second response voice as the response voice in accordance with a result of the comparison.

12. The voice interaction method according to claim 11, wherein a plurality of speech signals are acquired and for each of the plurality of acquired speech signals, the identifying of a series of pitches, the identifying of a prosody index value, and the causing of the reproduction device to reproduce a response voice are executed, and wherein the threshold value is set to a representative value of prosody index values identified from the plurality of speech signals.

13. The voice interaction method according to claim 11, wherein in the causing of the reproduction device to reproduce the response voice, the first response voice is selected in a case where the prosody index value is a value outside a predetermined range that includes the threshold value, and the second response voice is selected in a case where the prosody index value is a value within the predetermined range.

14. The voice interaction method according to claim 10, wherein a plurality of speech signals are acquired and for each of the plurality of acquired speech signals, the identifying of a series of pitches and the causing of the reproduction device to reproduce a response voice are executed, and wherein in the causing of the reproduction device to reproduce the response voice, the first response voice is selected as the response voice directed toward a speech sound that is selected randomly from among a plurality of speech sounds indicated by the plurality of speech signals.

15. The voice interaction method according to claim 14, wherein the causing of the reproduction device to reproduce the response voice includes setting a frequency for reproducing the first response voice as the response voice directed toward the plurality of speech sounds.

16. The voice interaction method according to claim 15, wherein the frequency for reproducing the first response voice is set in accordance with a usage history of a voice interaction.

17. The voice interaction method according to claim 1, the method further comprising generating a usage history of a voice interaction in which the response voice is reproduced in response to the speech sound, wherein the response voice has a prosody corresponding to the usage history.

18. The voice interaction method according to claim 17, wherein in the causing of the reproduction device to reproduce the response voice, an interval between the speech sound and the response voice is controlled as the prosody in accordance with the usage history.

19. A voice interaction apparatus comprising: a processor coupled to a memory storing instructions that, when executed by the processor, configure the processor to: acquire a speech signal indicative of a speech sound that is directed toward an interacting partner; identify a series of pitches of the speech sound from the speech signal; identify a lowest pitch among the series of pitches, wherein the series of pitches are pitches of a tailing section proximate to an end point within the speech sound; and cause a reproduction device to reproduce a response voice of pitches controlled in accordance with the lowest pitch.

20. The voice interaction apparatus according to claim 19, wherein the response voice has a prosody corresponding to transition of the pitches identified during the tailing section.

21. The voice interaction apparatus according to claim 19, wherein the response voice is selected from among a first response voice and a second response voice, wherein the first response voice represents an inquiry directed toward the speech sound and the second response voice represents a response other than an inquiry.

22. The voice interaction apparatus according to claim 19, wherein the processor is further configured to generate a usage history of a voice interaction in which the response voice is reproduced in response to the speech sound; and wherein the response voice has a prosody corresponding to the usage history.

* * * * *